United States Patent [19]
Kobayashi

[11] Patent Number: 6,050,802
[45] Date of Patent: Apr. 18, 2000

[54] RESIN MOLDING MACHINE

[75] Inventor: Kazuhiko Kobayashi, Nagano, Japan

[73] Assignee: Apic Tamada Corporation, Nagano, Japan

[21] Appl. No.: 08/912,611

[22] Filed: Aug. 18, 1997

[30] Foreign Application Priority Data

| Aug. 20, 1996 | [JP] | Japan | 8-218221 |
| Dec. 19, 1996 | [JP] | Japan | 8-339371 |
| Apr. 11, 1997 | [JP] | Japan | 9-093810 |
| Apr. 22, 1997 | [JP] | Japan | 9-104349 |

[51] Int. Cl.$^7$ ................................ B29C 45/02
[52] U.S. Cl. ............ 425/116; 425/544; 425/121; 425/126.1; 425/233
[58] Field of Search ................... 425/112, 116, 425/236, 544, 129.1, 543, 121, 123, 546, 233; 264/272.11, 272.17, 40.1

[56] References Cited

FOREIGN PATENT DOCUMENTS

| 0428792 | 5/1991 | European Pat. Off. . |
| B2-64-6539 | 2/1989 | Japan . |
| 05261753 | 10/1993 | Japan . |
| A-7-32414 | 2/1995 | Japan . |
| 0819571 | 8/1996 | Japan . |
| 2280141 | 1/1995 | United Kingdom . |

*Primary Examiner*—Angela Ortiz

[57] ABSTRACT

In the resin molding machine of the present invention, molding dies, which are included in at least one of press units, can be exchanged, repaired or cleaned, or molding executed by respectively controlling the press unit can be executed by said molding dies without stopping the operation of the machine. Workpieces are conveyed from a work supplying section to the press units. And molded products are conveyed from the press units to a product accommodating section. A base unit includes the work supplying section, the product accommodating section and a loader and an unloader. The loader and the unloader convey the works and the products. The press units are detachably attached to said base unit.

16 Claims, 12 Drawing Sheets

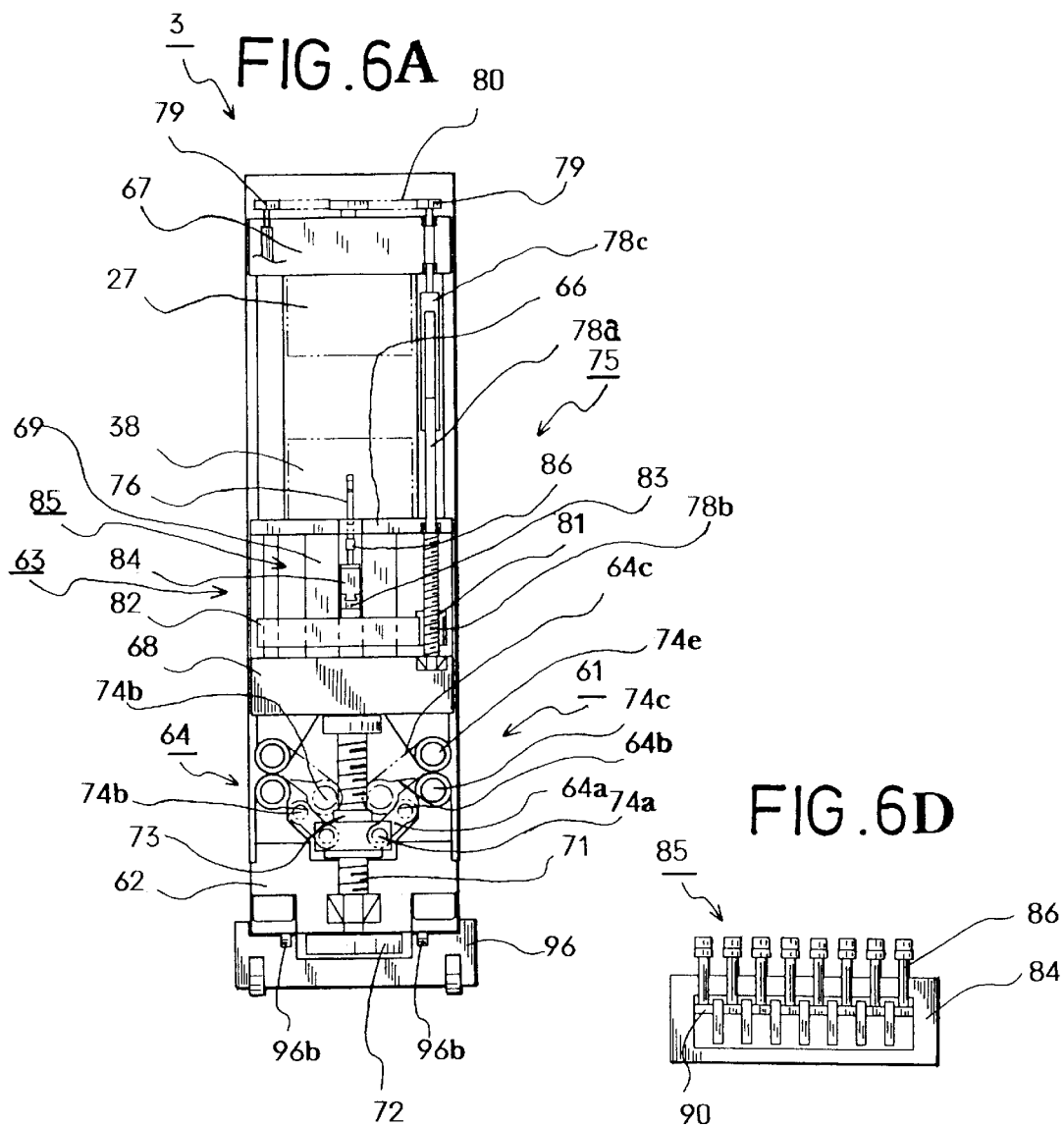
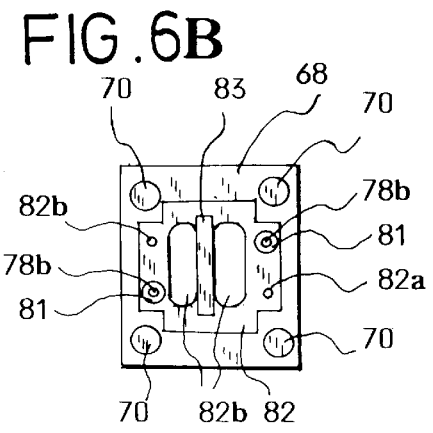
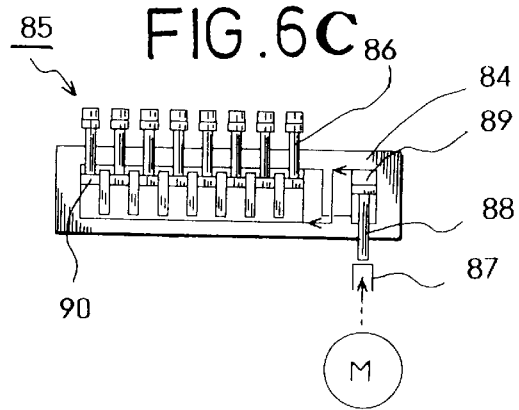

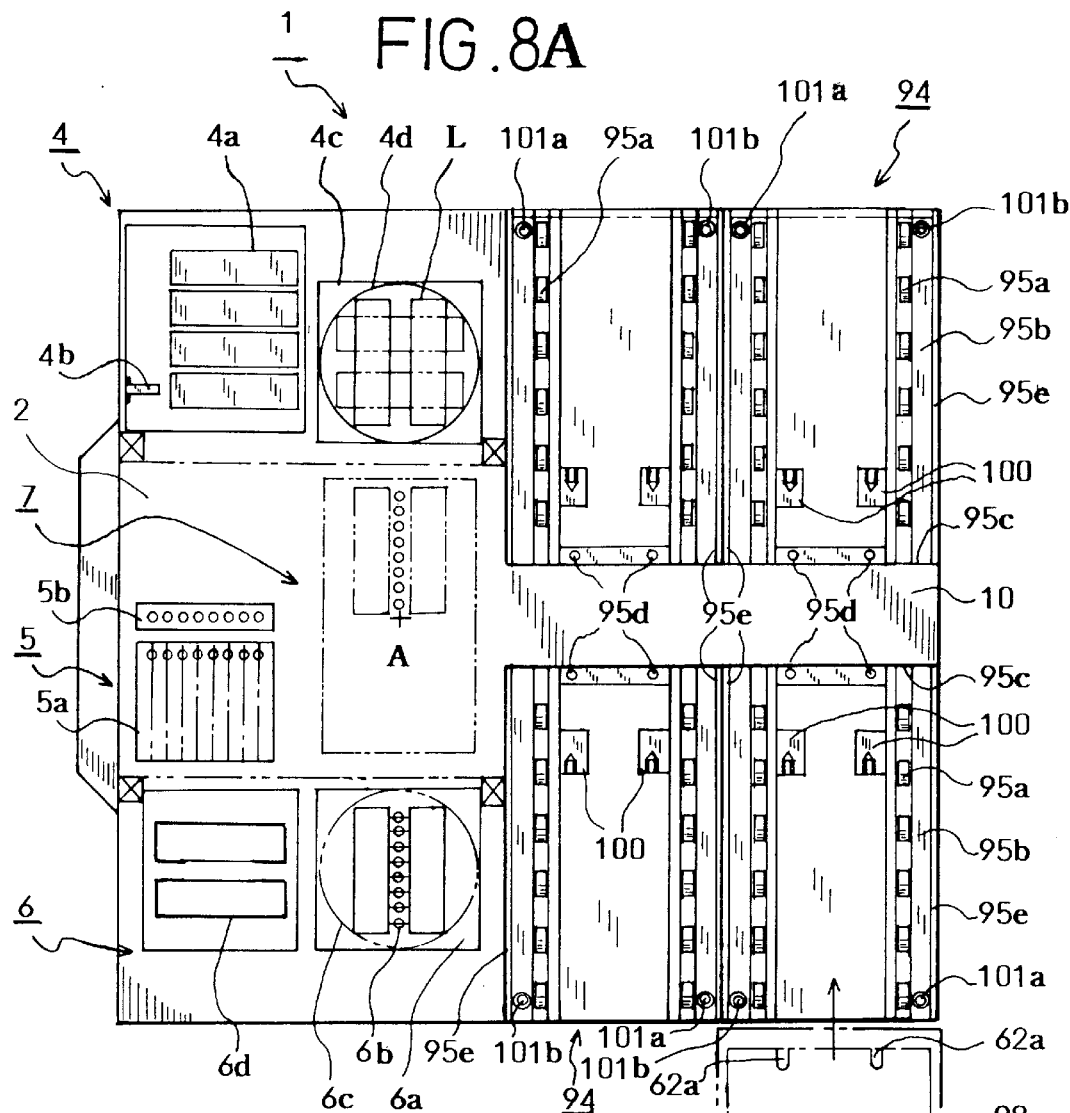
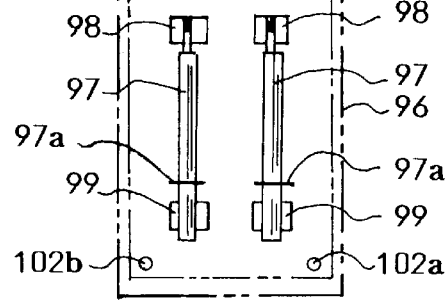
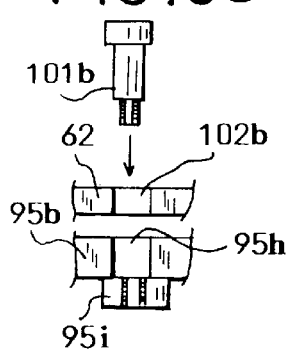
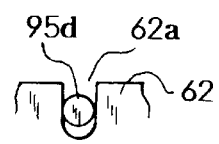
FIG.8A
FIG.8B
FIG.8C
FIG.8D

RESIN MOLDING MACHINE

BACKGROUND OF THE INVENTION

The present invention relates to a resin molding machine, more precisely relates to a resin molding machine, in which workpiece are supplied from a work supplying section to press units to mold, and the molded products are conveyed from the press units to a product accommodating section.

In the resin molding machine, an upper die and a lower die are relatively moved close and away. Workpieces, hereinafter called works, e.g., lead frames for ICs, LSIs, diodes, are mounted on the lower die, then the dies are closed to mold the works with resin.

A conventional resin molding machine is shown in FIG. 12. Works (lead frames on which IC chips have been mounted) are accommodated in a lead frame supplying section 201. Resin tablets are accommodated in a tablet supplying section 202. A prescribed number of the lead frames are supplied onto a table 204 from the lead frame supplying section 201. The number of the lead frames corresponds to the number of molding sections 203 of the molding dies. Prescribed number of the resin tablets are supplied onto a table. The number of the resin tablets corresponds to the number of pots in the molding dies. The lead frames and the resin tablets on the table are picked up and conveyed to the molding dies by a loader (not shown). The lead frames are molded in the dies with the resin. After molding, molded products, which have been ejected from the dies, are picked up and conveyed to a degating section by an unloader 205. Disused resin is removed from the molded products, then the products and the disused resin are separately collected. When the unloader 205 moves in a space between the upper die and the lower die which have been opened, a cleaner 206 of the unloader 205 cleans parting faces of the dies.

In the case of molding another kind of works, the resin molding machine must be wholly stopped so as to change the molding sections 203. And the lead frame supplying section 201 and the resin supplying section 202 must be changed according to the new works. Further, in the case of cleaning the molding sections 203 with melamine resin, exchanging the molding sections 203 due to damage, etc., the resin molding machine must be wholly stopped. To restart the resin molding machine after cleaning or maintenance, it takes about 1–2 hours until the temperature of the molding dies reaches and is fixed at predetermined temperature. So manufacturing efficiency must be lower.

To adjusting amount of products, it is impossible to mold works by using, for example, two molding sections out of four due to unbalanced clamping. Namely, the dies cannot be used partially. In the case of mass production, the molding dies must be large and heavy, so it is difficult to handle the dies and to make the dies with fixed manufacturing accuracy.

Further, the quality of the molded products cannot be fixed in the large dies.

To uniformly mold the works, a resin molding machine was disclosed in Japanese Patent Patent Gazette No. 64-6539. The resin molding machine has a plurality of press units, in each of which dies are capable of molding one or two lead frames in one molding cycle. Namely, the dies can be small and light, further the dies can be manufactured with fixed manufacturing accuracy.

However, in the resin molding machine disclosed in the Japanese Gazette No. 64-6539, the dies are small in size, so a layout of the resin molding machine must be greatly changed when additional press units are attached so as to increase amount of production.

To easily increase and decrease the amount of production, a resin molding machine was disclosed in Japanese Patent Publication Gazette No. 7-32414. In the resin molding machine, a plurality of sets of molding units, each of which can mold, for example, two lead frames, can be respectively detachably set in a base of the molding machine. With this structure, the the amount of production can be adjusted by attaching or detaching the molding units.

However, in the resin molding machine disclosed in the Japanese Gazette No. 7-32414, routes of a loader for supplying lead frames and a loader for collecting molded products are respectively arranged on each side of the molding units, which are connected in series. With this structure, it is difficult to exchange molding sections of the molding units and to repair the molding units. Further, a large area is required when molding units are connected in series for mass production.

In the transfer molding machine shown in FIG. 12, an electric or hydraulic driven clamping mechanism securely clamps the works between the dies so as to prevent resin leakage, and a transfer mechanism equally exerts the resin in each pot so as to mold the works with equal resin pressure. The mechanisms will be explained with reference to FIG. 13. The clamping mechanism vertically moves a movable platen 305, on which a lower die 304 is fixed, by a hydraulic system (not shown). The transfer mechanism, which has a plurality of plungers (not shown) vertically moving in pots in the lower die 304, is provided to the movable platen 305. The movable platen 305 has a plurality of holes 306 in each of which a plunger holder 307 is provided. The plunger holders 307 are respectively held by pressure equalizing units 308. The pressure equalizing units 308 hydraulically equalize resin pressure in each pot. By the pressure equalizing units 308, the works can be equally molded even if the amount of the resin tablets are not equal. The pressure equalizing units 308 are slidably fitted in slide grooves 309A of an attaching plate 309, so the pressure equalizing units 308 can be pulled out toward the front side. The attaching plate 309 is connected to a transfer cylinder 311 and is capable of vertically moving along guide rods 310. The transfer cylinder 311 is vertically moved by a platen cylinder 312.

When the platen cylinder 312 is moved upward, the pressure equalizing units 308, which are attached to the attaching plate 309, is upwardly moved together with the transfer cylinder 311. By this action, the plungers, which are connected to the pressure equalizing units 308, exert melted resin in the pots to send toward cavities.

These days, ICs are highly integrated and manufactured in a total line, in which wire bonding and resin molding are executed, so the resin molding machine is often used in a clean room, e.g., class 1000. In the clean room, air is filtered to removed fine dusts to increase quality of ICs.

However, in the resin molding machine shown in FIG. 13, resin chips or dusts 313 are piled in the vicinity of the plunger holders 307 and on the attaching plate 309 through the holes 306. If the resin dusts 313 invades into the slide grooves 309A, the pressure equalizing units 308 cannot exchanged.

In the case of manually removing the resin dusts 313 by cleaning means, it is difficult or impossible to insert the cleaning means into the transfer mechanism because the supplying section, the press units and the accommodating section are integrally assembled. By the integrated structure, it is also difficult to repair or clean the clamping mechanism and the driving means of the transfer mechanism.

To overhaul the resin molding machine, the resin molding machine must be wholly stopped. In some cases, the whole machine must be carried out from the clean room; it must be installed thereinto after the overhauls. So it is trouble some to carry out and install the machine for the overhaul. Further, it is bad to open the clean room for overhauling the resin molding machine because many dusts or particles enter thereinto.

In the resin molding machine shown in FIG. 12, the works are supplied from one side of the molding die; the molded products are taken out toward the other side thereof. On the other hand, in a conventional resin molding machine shown in FIG. 14, the works and the products are supplied from and taken out toward one side of the molding dies. In FIG. 14, the lead frames are supplied from a lead frame supplying section 401 to a lead frame arranging section 402 to preheat. The resin tablets are supplied from a resin supplying section (a resin cassette) 403 to a rotary table 402a of the lead frame arranging section 402. The resin tablets are held in a holder 403a while carrying. The lead frames and the resin tablets are held and carried from the lead frame arranging section 402 to molding dies 405 by a loader 404. The lead frames are clamped by the molding dies 405, then melted resin is introduced into the dies 405 to mold the lead frames. After molding the lead frames with the resin, the molded products (the molded lead frames) are picked up and carried to a degating section 407 by an unloader 406 to remove disused resin of the products. The molded products, whose disused resin has been removed by the degating section 407, are accommodated in an accommodating section 408.

The loader 404 is moved along a guide shaft 409, in an X-direction, between a supplying position and a setting position; the unloader 406 is moved along the guide shafts 409, in the X-direction, between a pick-up position and a degating position. The loader 404 and the unloader 406 are arranged parallel to the guide shaft 409. The loader 404 and the unloader 406 are capable of moving in a Y-direction, so they can reciprocatively moved toward and moved away from the molding dies 405. By the reciprocative movement of the loader 404 and the unloader 406 in the Y-direction, the loader can supply the works in the dies 405, and the unloader 406 can pick up the molded products there from.

In the resin molding machine shown in FIG. 14, the loader 404 and the unloader 406 can be respectively linearly moved along the guide shaft 409, so the resin molding machine must be elongated in the X-direction. Namely, a large area is required to install the machine. Especially in the case of installing the machine in the clean room, reducing the area for installation are is required.

In the case of using a plurality of the dies 405 for mass production, the length of the machine, in the X-direction, must be longer. One cycle of the resin molding includes the steps of: picking up the molded products by the unloader 406 from the die 405; moving the unloader 406 away from the die 405; cleaning the parting faces of the die 405; and supplying the next works onto the die 405 by the loader 404. These steps will be executed for each die 405, so molding cycle time is long. It is difficult to shorten the molding cycle time.

SUMMARY OF THE INVENTION

A first object of the present invention is to provide a resin molding machine, in which at least one of press units can be exchanged, repaired, cleaned and used for manual molding executed by respectively controlling the press unit without wholly stopping the resin molding machine.

A second object of the present invention is to provide a resin molding machine, in which the press units are made compact in size and capable of easily being handled.

A third object of the present invention is to provide a resin molding machine, which is capable of shortening the molding cycle time.

To achieve the first object, a first basic structure of the resin molding machine of the present invention comprises:
   a plurality of press units, each of which has an upper die and a lower die for clamping and molding a work to be molded; and
   a base unit including:
      a work supplying section for supplying the works to be molded;
      a product accommodating section for accommodating molded products; and
      means for conveying the works from said work supplying section to said press units and conveying the molded products from said press units to said product accommodating section,
   wherein said press units are detachably attached to said base unit.

In the first structure, the base unit may further includes a conveying route on which the works and the products are conveyed, and the press units may be provided on both sides of the conveying route.

In the first structure, the base unit may be formed into a rectangular parallelepiped, and each press unit may be detachably attached on a side face of the base unit.

In the first structure, the works to be molded may be lead frames, and the work supplying section may include:
   a lead frame supplying section for supplying a supplying magazine in which the lead frames are accommodated; and
   a resin supplying section having a holder, which is capable of vertically moving resin tablets in a resin cassette so as to supply the resin tablets.

In the first structure, the product accommodating section may include:
   a degating section for removing disused resin from the molded lead frames; and
   an accommodating magazine in which the molded lead frames, from which the disused resin has been removed, are accommodated.

In the first structure, maintenance of the dies of the press unit may be executed while operating the molding machine.

In the first structure, another kind of product may be manually molded in the press unit while operating the molding machine.

To achieve the second object, a second basic structure comprises the resin molding machine according to the first structure;
   wherein each the press unit comprises:
      a clamping mechanism for moving the lower die to clamp the work;
      a transfer mechanism for vertically moving a plurality of plungers, which are provided in the lower die, to exert resin supplied in pots; and
      means for driving the clamping mechanism and the transfer mechanism.

In the second structure, the driving means may be an electric motor, and the clamping mechanism may comprise:
   a movable platen for supporting the lower die; and a toggle mechanism being driven by the electric motor so as to vertically move the movable platen.

In the second structure, the transfer mechanism may comprise:
- a screw shaft being rotatably provided to the movable platen;
- a nut being screwed with the screw shaft, the nut being capable of vertically moving on the screw shaft; and
- a pressure equalizing unit for equally applying pressure to the plungers, the pressure equalizing unit being capable of vertically moving together with the nut when the electric motor rotates the screw shaft.

In the second structure, the pressure equalizing unit may include a hydraulic circuit for equally applying hydraulic pressure to the plungers.

In the second structure, each the press unit may be correctly positioned by attaching the press unit to an attaching section, which is provided in the base unit.

To achieve the third object, a third structure comprises:
- a resin molding machine according to the first structure;
- wherein the conveying means comprises:
  - a loader for supplying the works from the work supplying section to the press units; and
  - an unloader for conveying the molded products from the press units to the product accommodating section,
- wherein the loader and the unloader are vertically arranged, and the loader and the unloader are independently rotated.

In the third structure, the lower die of each press unit may be capable of vertically moving, the loader may transfer the works, which are held by supplying-and-holding means, onto the lower dies which have been moved upwardly, and the unloader may collect the molded products by downwardly moving collecting-and-holding means toward the lower dies which have been moved downwardly.

In the third structure, the supplying-and-holding means of the loader and the collecting-and-holding means of the unloader may respectively have:
- cleaners for cleaning the upper dies and the lower dies of the press units;
- sucking holes for sucking dusts which are removed from the dies by the cleaners; and
- sucking ducts being respectively connected with the sucking holes.

In the third structure, the loader may enter a space between the upper die and the lower die of the press unit, with the supplying-and-holding means holding the works, and may clean the upper die when the unloader moves out from the space therebetween, with the collecting-and-holding means holding the molded products, and may clean the lower die as if the supplying-and-holding means is replaced with the collecting-and-holding means in the space.

In the third structure, the loader and the unloader may be reciprocatively moved to cross the moving direction of the supplying-and-holding means and the collecting-and-holding means, which are capable of reciprocatively moving to and away from the press units.

In the third structure, the work supplying section, a resin supplying section, the press units and the product accommodating section may be provided to enclose the loader and the unloader.

In the third structure, the work supplying section, the resin supplying section, the press units and the product accommodating section may be respectively formed into units, which can be mutually assembled and disassembled.

To achieve the first to the third objects, a fourth structure comprises:
- a plurality of press units, each of which has an upper die and a lower die for clamping and molding a work to be molded; and
- a base unit including means for conveying the works and molded products,
- wherein the press units are detachably attached to the base unit,
- wherein each the press unit comprises:
  - a clamping mechanism for moving the lower die to clamp the work;
  - a transfer mechanism for vertically moving a plurality of plungers, which are provided in the lower die, to exert resin supplied in pots; and
  - means for driving the clamping mechanism and the transfer mechanism, and
- wherein the conveying means comprises:
  - a loader for supplying the works from the work supplying section to the press units; and
  - an unloader for conveying the molded products from the press units to the product accommodating section,
- wherein the loader and the unloader are vertically arranged, and the loader and the unloader are independently rotated.

In the resin molding machine of the first structure, the press units can be detachably attached to the base unit, so each press unit can be solely detached from the base unit. With this structure, the press unit which has been detached can be exchanged, repaired, cleaned and used for manual molding without wholly stopping the resin molding machine. Therefore, working efficiency of the machine can be raised.

In the second structure, the press units has the clamping mechanism, transfer mechanism and the driving means only. So the detachable press units can be small and light. The small and light press units can be easily handled. And they can be carried out and into the clean room without widely opening the clean room, so that the clean room can be kept highly clean. When the press units are attached to the base unit, they can be attached thereto without attaching means for conveying the works and the products. If each press unit can be correctly positioned by attaching the press unit to the attaching section, working efficiency of exchanging the press units can be raised. If the pressure equalizing unit is driven by the hydraulic system, and the clamping mechanism and the transfer mechanism are driven by the electric motor, the press unit can be small and light. With this structure, the press units can be precisely controlled and operated at high speed. Even if the moving speed of the press units is changed, they can be controlled without shock. Further, the amount of the resin is not equal in all pots, resin pressure of the melted resin can be equalized by the pressure equalizing units. Especially, each pressure equalizing unit includes a closed hydraulic circuit for equally applying hydraulic pressure to the plungers, so the pressure equalizing units have no oil tanks. By no oil tanks, the press units can be small and light, so the resin molding machine can be properly used in the clean room.

In the third structure, the loader and the unloader are vertically arranged, and they can be independently rotated. So the conveying means can be compact in size. Thus, the resin molding machine also can be compact in size. If the loader enters the space between the upper die and the lower die, with the supplying-and-holding means holding the works, and cleans the upper die when the unloader moves out from the space there between, with the collecting-and-holding means holding the molded products, and cleans the lower die as if the supplying-and-holding means is replaced with the collecting-and-holding means in the space, the molding cycle time between supplying the works and accommodating the molded products can be shortened, namely a high speed molding machine can be realized. In the case that the loader and the unloader are reciprocatively moved to cross the moving direction of the supplying-and-holding means and the collecting-and-holding means, which are capable of reciprocatively moving to and away from the press units, the works and the molded products can be handled by extending strokes of the loader and the unloader even if the press units are further added to the base unit. Further, if the work supplying section, the resin supplying section, the press units and the product accommodating section enclose the loader and the unloader, and they are respectively formed into units which can be mutually assembled and disassembled, the resin molding machine can be easily operated and controlled.

BRIEF DESCRIPTION OF THE DRAWINGS

Embodiments of the present invention will now be described by way of examples and with reference to the accompanying drawings, in which:

FIG. 6A is a front view of a press unit;

FIG. 6B is a plan view of a attaching plate;

FIG. 6C is an explanation view of a pressure equalizing unit;

FIG. 6D is an explanation view of the pressure equalizing unit;

FIG. 8A is a plan view of the base unit;

FIG. 8B is an explanation view of a mechanism for fixing the press unit;

FIG. 8C is an explanation view of a sleeve bolt of the fixing mechanism;

FIG. 8D is an explanation view of an engaging pin of the fixing mechanism;

DETAILED DESCRIPTION OF THE PREFERRED EMBODIMENTS

Preferred embodiments of the present invention will now be described in detail with reference to the accompanying drawings.

First Embodiment

In the First Embodiment, four press units are detachably attached to a base unit.

Figure 1:
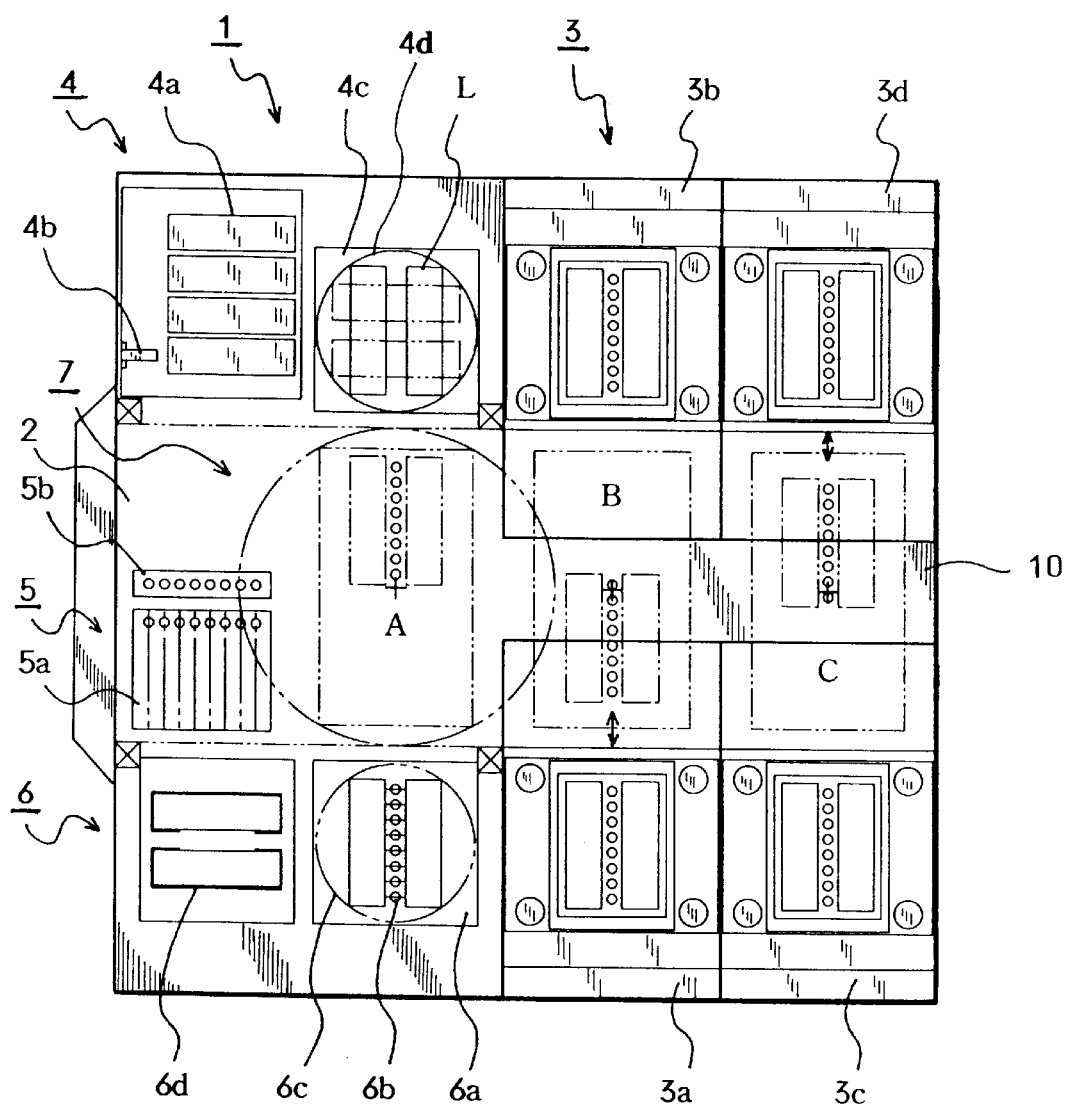
FIG. 1 is a plan view of the resin molding machine of the resin molding machine of First Embodiment.

In FIG. 1, the resin molding machine 1 has a base unit 2 and four press units 3, each of which is respectively detachably attached to the base unit 2.

The base unit 2 does not mold works; the base unit 2 has: a lead frame supplying section 4, which acts as a work supplying section, for supplying a lead frame or lead frames "L" and resin tablets; and a lead frame accommodating section 6, which accommodates a molded product or molded products (molded lead frames). The base unit 2 further has a loader unit 7, which acts as means for conveying the lead frames, the resin tablets and the molded products. The loader unit 7 has: a loader 8 for conveying the lead frames "L", which are supplied from the lead frame supplying section 4, and the resin tablets, which are supplied from a resin supplying section 5, to each press unit 5; and an unloader 9 for conveying the molded lead frames (products) from the press units 3 to the lead frame accommodating section 6. The loader 8 and the unloader 9 are vertically arranged in the loader unit 7. The press units 3, which are capable of being respectively detached from the base unit 2, have a molding function only.

(The Base Unit)

In FIG. 1, a plurality of the lead frames "L", on which IC chips have been mounted, are accommodated in the lead frame supplying section 4. There is a plurality of holders 4a, in each of which a plurality of lead frames "L" are accommodated, in the lead frame supplying section 4. The lead frames "L" are cut and supplied, one by one, onto a rotary table 4d of a supplying table 4c by a pusher 4b. The rotary table 4d is rotated 180° for cutting one lead frame "L". When two lead frames "L" are cut, the rotary table 4d rotates 90° from a first position, which is shown by two-dot chain lines in FIG. 1, to a second position, which is shown by solid lines in FIG. 1, and stops at the second position. Then the loader 8 is moved from the first position to pick up two lead frames "L" from the rotary table 4d. Note that, the lead frames "L" on the rotary table 4d have been preheated by a heater (not shown).

Figure 2:
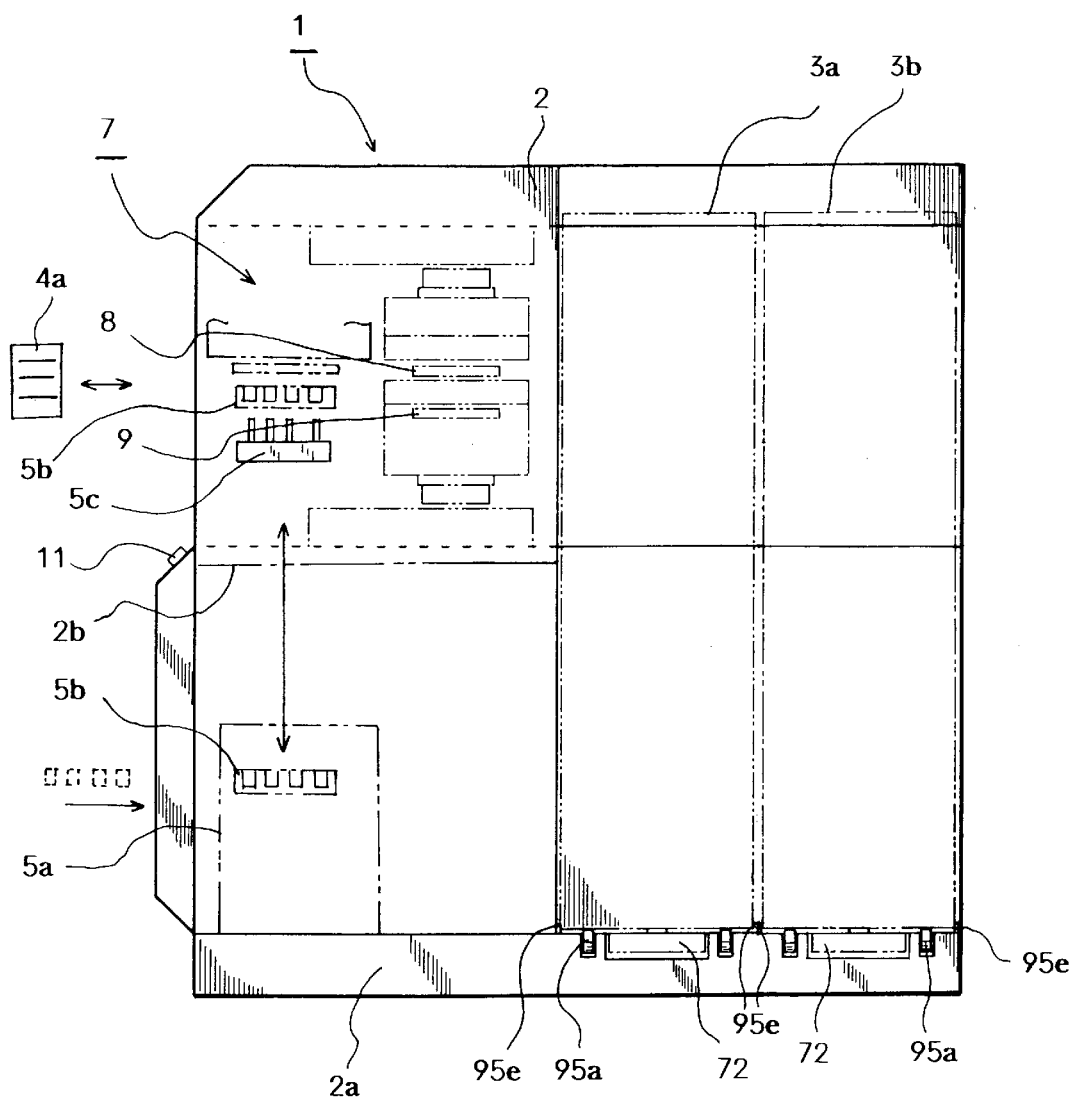
FIG. 2 is a front view of the resin molding machine shown in FIG. 1.

In FIG. 2, the lead frame supplying section 4 and the lead frame accommodating section 6 are attached on a base plate * 2, which is supported by rods vertically provided on a base 2a of the base unit 2. Supplying magazines 4a, in which the lead frames "L" to be molded are accommodated, are supplied to and taken out from the lead frame supplying section 4 on the base plate 2b; accommodating magazines 6d (see FIG. 1), in which the molded products are accommodated, are supplied to and taken out from the lead frame accommodating section 6 on the base plate 2b.

As shown in FIG. 2, the resin supplying section 5 has a tablet cassette 5a, which is provided on the base 2a. The resin tablets are respectively supplied into holders 5b by the tablet cassette 5a. Each holder 5b is capable of vertically moving. And each holder 5b has a plurality of accommodating holes, which are bored to correspond to pot pitch of the molding dies; the resin tablets are respectively supplied into the accommodating holes. The resin tablets are transferred from the holder 5b to the loader 8, which is waiting above the holder 5b, by the steps of: moving the holder 5b upward; and pushing the resin tablets, which are in the holder 5b, upward by a pusher 5c. When the holder 5b is moves upward, the pusher 5c is moved sideward to avoid interference. Note that, a parts feeder, for example, may be employed to supply the resin tablets into the holder 5b. The resin tablets in the holder 5b are transferred when the loader 8 is rotated 90° in the counterclockwise direction from the first position, which is shown by the two-dot chain lines in FIG. 1. Note that, the loader 8 may hold the lead frames "L" after the resin tablets are transferred from the holder 5b.

The molded products, which are the molded lead frames "L", are accommodated in the lead frame accommodating section 6. The lead frame accommodating section 6 has a degating section 6a, which removes disused solidified resin 6b from the molded lead frames "L". Namely, the disused resin 6b, e.g., culls, runners, gates, are removed from the molded lead frames "L" by the degating section 6a. The molded products and the disused resin 6b are separately collected. A pick-up unit 6c holds the molded products "L", then rotates 90° and conveys to the accommodating magazine 6d. On the other hand, the disused resin 6b are collected in a box (not shown) under the degating section 6a after the molded products "L" are collected.

In FIG. 1, a conveying route 10 is formed into a T-shape by outwardly extending a part of the base unit 2 from a rotating position "A" of the loader unit 7. The loader unit 7 is moved on the conveying route 10. There are provided a plurality of attaching sections, to which the press units 3 are detachably attached, on both sides of the conveying route 10. The press units 3 are mechanically and electrically connected to the base unit 2 by mounting on the base 2a of the base unit 2. Note that, the press unit 3 may be connected to the base unit 2 by contacting the conveying route 10 in stead of employing the attaching sections.

Control commands or control parameters for controlling the base unit 2 and the press units 3 can be inputted by an operating section 11 (see FIG. 2).

(The Loader and the Unloader)

The loader 8 and the unloader 9 of the loader unit 7 (see FIG. 1) will be explained.

As shown in FIG. 1, the four press units 3 are detachably attached to both sides of the conveying route 10. Thus, the loader unit 7 is moved from the position "A" to a position "B" then the loader 8 and the unloader 9 are moved to and away from the first press unit 3a and the second press unit 3b so as to supply the lead frames "L", etc. to and collect the molded products from the press units 3a and 3b; the loader unit 7 is moved from the position "A" to a position "C" then the loader 8 and the unloader 9 are moved to and away from the third press unit 3c and the fourth press unit 3d so as to supply the lead frames "L", etc. to and collect the molded products from the press units 3c and 3d.

The loader 8 supplies the lead frames "L" to be molded and the resin tablets from the base unit 2 to the press units 3; the unloader 9 conveys the molded products from the press units 3 to the base unit 2. The loader 8 and the unloader 9 are arranged to vertically pile, so they can be moved in parallel planes. With this structure, the required area for the resin molding machine can be much reduced.

The rotating position "A", which is located between the rotary table 4b and the degating section 6a, is a home position of the loader unit 7. The loader 8 is moved from the home position "A" to the rotary table 4d to hold the lead frames "L", then the loader 8 is moved back to the home position "A"; the unloader 9 holding the molded products is moved from the home position "A" to the degating section 6a, then the unloader 9 is moved back to the home position "A" after releasing the molded products.

Figure 3A:
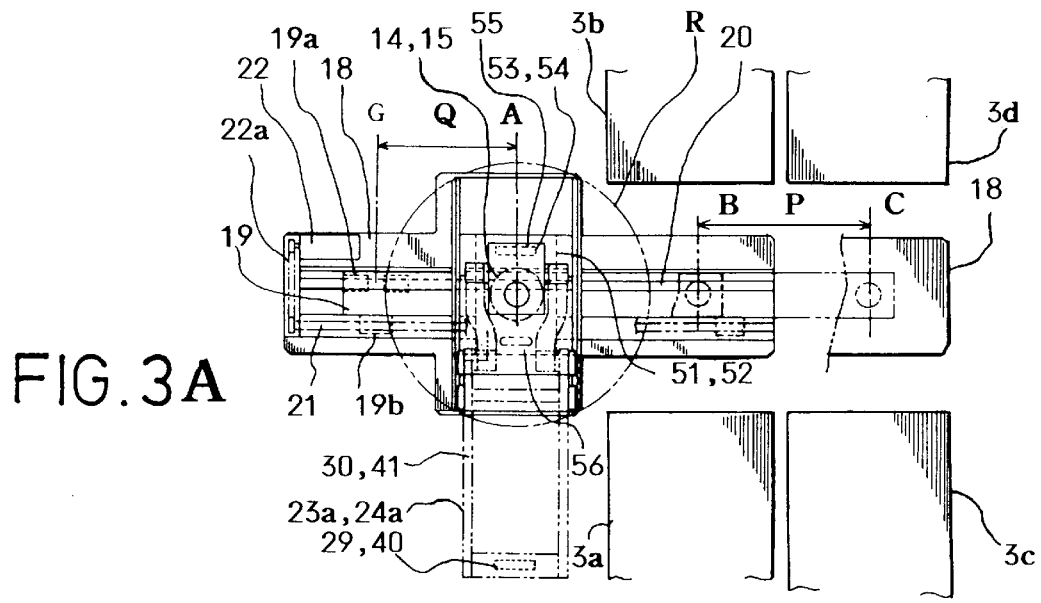
FIG. 3A is a plan view of a loader and an unloader.
Figure 3B:
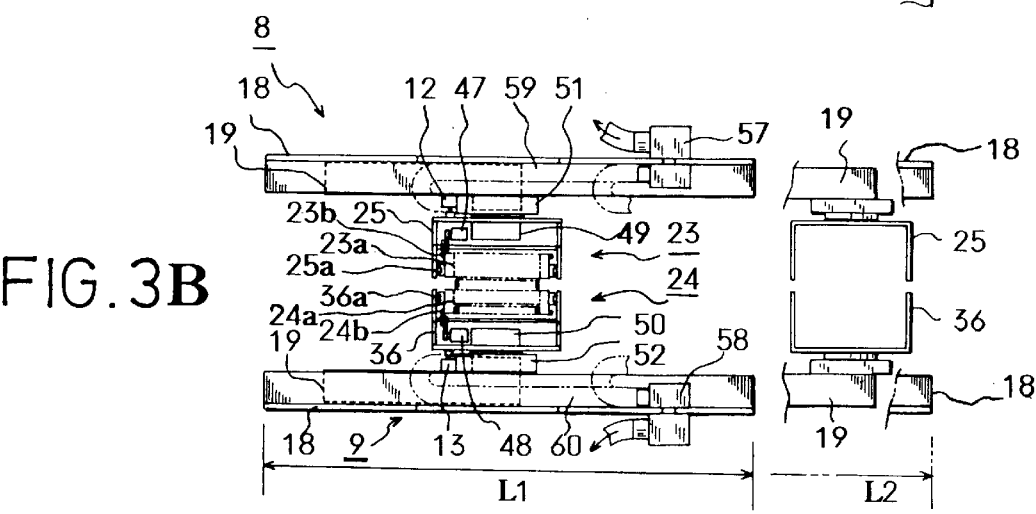
FIG. 3B is a front view of the loader and the unloader.

As shown in FIG. 3B, the loader 8 and the unloader 9 respectively have electric motors 12 and 13. Timing pulleys 16 and 17 are respectively fixed to shafts 14 and 15, which is rotated by the motors 12 and 13. A timing belt (not shown) is engaged between the timing pulleys 16 and 17. When the motors 12 and 13 are driven, the loader 8 is rotated together with the shaft 14; the unloader 9 is rotated together with the shaft 15. Note that, cables 14a and 15a for supplying electric force to the loader 8 and the unloader 9 are respectively provided in the shafts 14 and 15.

A mechanism for driving the loader 8 and the unloader 9 will be explained. In FIG. 3A, the loader 8 and the unloader 9 are attached to an attaching member 18. The shafts 14 and 15 for rotating the loader 8 and the unloader 9 are supported by a movable supporting member 19, which is capable of reciprocatively moving in the longitudinal direction of the attaching member 18. The movable supporting member 19 is movably attached to a rail 20, which is fixed to the attaching member 18 and arranged in the longitudinal direction thereof, by a guide member 19a. The attaching member 18 has a ball screw 21, which is arranged parallel to the rail 20. The ball screw 21 is rotated in both directions by a servo motor 22, which is mounted on the attaching member 18. The rotary torque of the servo motor 22 is transmitted to the ball screw 21 by a timing belt 22a.

The ball screw 21 is screwed with a nut 19b of the movable supporting member 19, so the movable supporting member 19 is moved, along the rail 20, between the position "A" and the positions "B" and "C" (see FIG. 3A), which correspond to the press units 3 on both sides of the conveying route 10, when the ball screw 21 is rotated. In the present embodiment, the rail 20 is not arranged under center of the shafts 14 and 15. Since the cables 14a and 15a are passed through the shafts 14 and 15, total height of the loader 8 and the unloader 9 must be higher if the rail 20 is arranged under center of the shafts 14 and 15, because the space of passing the cables 14a and 15a must be required.

The length of the attaching member 18, the rail 20 and the ball screw 21 is "L2" as shown in FIG. 3B. In the case that distance "Q" between a position "G" of the guide 19a and the home position "A" is equal to distance "P" between the positions "B" and "C", and that the movable supporting member 19 can be projected the length "P" from the end of the attaching member 18, the length of the attaching member 18, the rail 20 and the ball screw 21 may be "L1". In this case, the loader unit 7 can be applied to the resin molding machine having two press units and four press units.

Figure 3C:
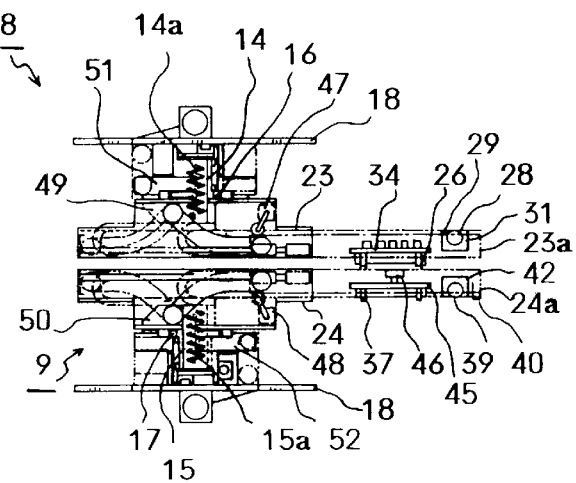
FIG. 3C is a left side view of the loader and the unloader.

As shown in FIGS. 3B and 3C, the loader 8 has a moving body 23. The moving body 23 is capable of holding the lead frames "L" to be molded and entering the press units 3, whose dies have been opened, to supply the lead frames "L" onto the dies as a supplying-and-holding means. On the other hand, the unloader 9 has a moving body 24. The moving body 24 is capable of holding the molded products "L" and conveying them outside of the press units 3 as a collecting-and-holding means.

The moving bodies 23 and 24 will be explained with reference to FIGS. 3A–5.

Firstly, the moving body 23 of the loader 8 will be explained with reference to FIGS. 3A–4. The moving body 23 has a frame section 25, whose sectional shape is formed into a U-shape. A chucking hand 26, an upper cleaner 28 for cleaning a parting face of upper dies 27, a sucking hole 29 for sucking resin dusts and disused resin removed by the upper cleaner 28, a sucking duct 30 connected with the sucking hole 29, and a movable frame 23a are provided in the frame section 25. The sucking duct 30 is provided along the movable frame 23a and connected with a rotary duct 49.

The upper cleaner 28 is accommodated in a hood 31, which is connected with the sucking duct 30. In the present embodiment, an opening section of the hood 31 acts as the sucking hole 29 because the upper cleaner 28 is located at a front end of the loader 8 when moving body 23 enters the opened press units 3. With this structure, the opening section of the hood 31 preferably acts as the sucking hole 29. To avoid interference with the upper dies 27, the upper cleaner 27 is move close to and away from the parting faces of the upper dies 27 by a cylinder (not shown). Namely, the upper cleaner 28 is projected toward the upper dies 27 by the cylinder when the moving body 23 enters the opened dies.

Figure 4:
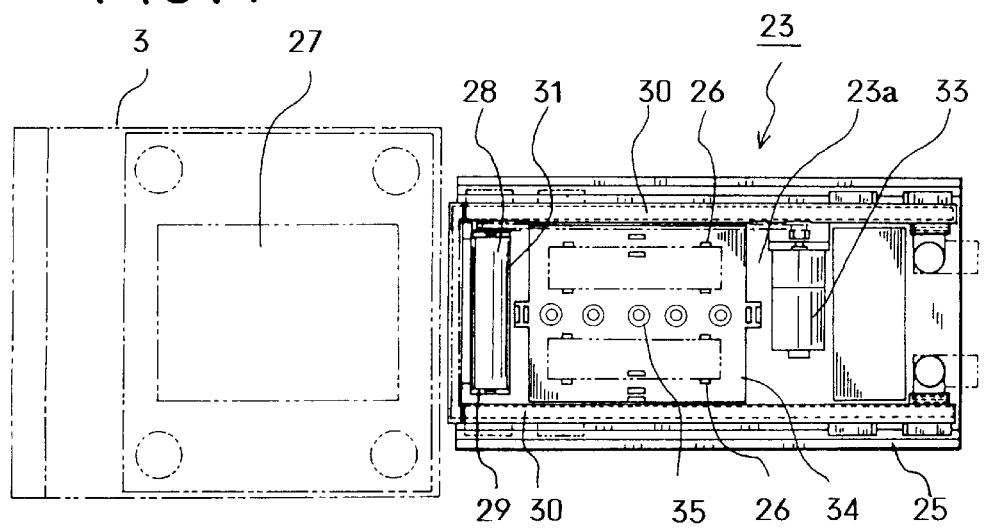
FIG. 4 is a plan view of the loader.

As shown in FIG. 4, the upper cleaner 28 is rotated by a motor 33, timing pulleys and a timing belt engaging with the timing pulleys. A chucking hand 26, which chucks the lead frames "L" to be molded, is held by an attaching plate 34. The resin tablets are held in tablet holes 35, which are formed in the attaching plate 34, and conveyed.

Next, the unloader 9 of the moving body 24 will be explained with reference to FIGS. 3A–5. The moving body 24 has a frame section 36, whose sectional shape is formed into a U-shape. A chucking hand 37, a lower cleaner 39 for cleaning a parting face of lower dies 38, a sucking hole 40 for sucking resin dusts and disused resin removed by the lower cleaner 39, a sucking duct 41 connected with the sucking hole 40, and a movable frame 24a are provided in the frame section 36. The sucking duct 41 is provided along the movable frame 24a and connected with a rotary duct 50.

The lower cleaner 39 is provided in an opening section of a hood 42. The sucking hole 40 is located beside the hood 42.

The sucking hole 40 and the lower cleaner 39 are separately provided. The sucking hole 40 is opened on a rear side with respect to the lower dies 38. It is desirable for the sucking hole 40 to open on the rear side because the lower cleaner 39 cleans the lower dies 38 when the movable body 24 is moved away from the press units 3.

Figure 5:
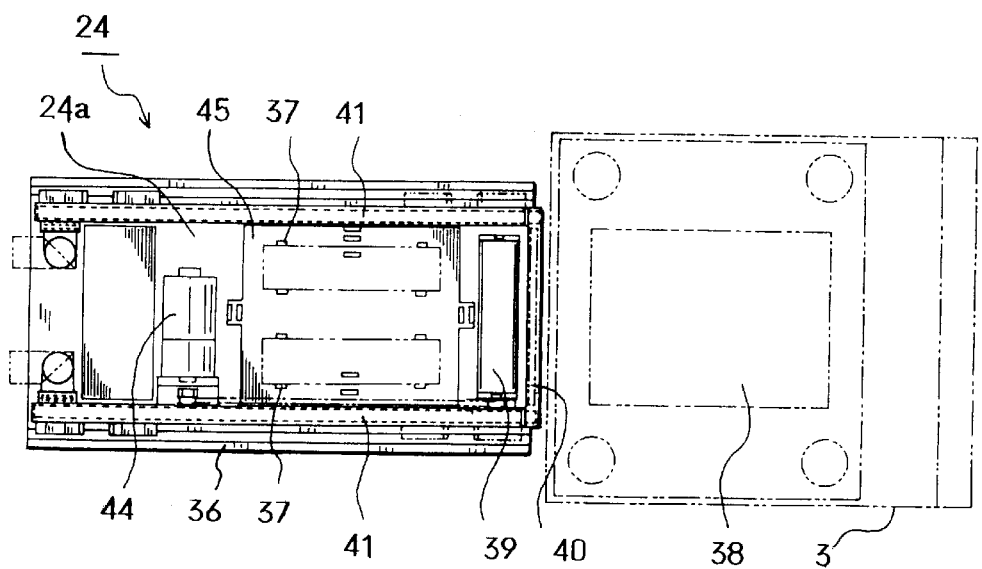
FIG. 5 is a plan view of the unloader.

As shown in FIG. 5, the lower cleaner 39 is rotated by a motor 44, timing pulleys and a timing belt engaging with the timing pulleys. The chucking hand 37 for chucking the molded products is held by an attaching plate 45. As shown in FIG. 3C, the attaching plate 45 can be downwardly moved by a cylinder 46. With this structure, claw chips of the chucking hand 37 can be located under the molded products, so that the molded products, which have been ejected from the lower dies 28, can be securely collected.

The action of the moving bodies 23 and 24 will be explained with reference to FIGS. 3B and 3C. Gears, which are respectively driven by motors 47 and 48 respectively provided to the moving bodies 23 and 24, are respectively engaged with racks 23b and 24b, which are respectively provided to the movable frames 23a and 24a. By driving the motors 47 and 48, the movable frame 23a and 24a are reciprocatively moved between the positions "B" and "C" (see FIG. 3A) and each press unit 3. The movable frames 23a and 24a are respectively moved along the guide rails 25a and 36a (see FIG. 3B), which are respectively provided within the frame sections 25 and 36. Since the moving bodies 23 and 24 are vertically arranged, the movable frames 23a and 24a can simultaneously enter the press units 3, whose molding dies have been opened.

Successively, the conveying action of the moving bodies 23 and 24 will be explained. Firstly, the loader 8 moves the movable frame 23a forward from the moving body 23 at the position "A" (see FIG. 3A), then chucks the lead frames "L", which have been supplied onto the rotary table 4d (see FIG. 1) of the lead frame supplying section 4c, by the chucking hand 46.

The movable frame 23a is once moved backward, then the loader 8 is rotated 90° in the counterclockwise direction by the motor 12. The movable frame 23a is moved forward again to chuck the resin tablets in the holder 5b, then the movable frame 23a is moved backward and rotated 90° in the clockwise direction or the counterclockwise direction. The movable supporting member 19 is moved along the rail 20 by the motor 22. In the case of supplying the lead frames "L" to the press units 3a and 3b, the loader 8 is moved along the conveying route 10 until the shaft 14 is moved from the position "A" to the position "B"; in the case of supplying the lead frames "L" to the press units 3c and 3d, the loader 8 is moved along the conveying route 10 until the shaft 14 is moved from the position "A" to the position "C". If the movement of the shaft 14 from the position "A" to the position "B" or "C" and the rotation of the loader 8 are simultaneously executed, cycle time of the machine can be shortened. Note that, a track "R" (shown in FIG. 3A) indicates the rotational track of the loader 8 and the unloader 9.

In each press unit 3, the lower die 38 is capable of vertically moving to and away from the upper die 27. The movable frame 23a of the moving body 23 enters a space between the dies 27 and 38, which has been opened, by the motor 47. The lead frames "L" and the resin tablets, which are chucked by the chucking hand 26, are supplied onto the lower die 38, which have been moved downward. When the movable frame 23a enters the space of the press unit 3 from the position "B" or "C" (see FIG. 3A), the upper cleaner 29, which has been accommodated in the hood 31, makes contact with the parting face of the upper die 27 by the cylinder. And, the upper cleaner 29 is rotated to clean the parting face; the resin dusts removed by the upper cleaner 29 are sucked into the sucking duct 30. On the other hand, when the movable frame 23a is moved away from the press unit 3 after the lead frames are supplied onto the lower die 38, the upper cleaner 27 is moved away from the upper die 27 and returned to the position or "C".

When the molded products are taken out from the press units 3 which have been opened, firstly the unloader 9 is moved to the position "B" or "C" (see FIG. 3A). The movable frame 24a of the moving body 24 is entered the space of the press unit 3 from the position "B" or "C" by the motor 48. Note that, the lower cleaner 39 is separated away from the lower die 38 when the movable frame 24a enters the space of the opened press units 3.

The chucking hand 37 is downwardly moved until reaching the lower die 38 by the cylinder 46. The chucking hand 37 chucks the molded products, which have been ejected from the lower die 38, and the chucking hand 37 is upwardly moved. Then the chucking hand 37 holding the molded products are returned from the press unit 3 to the position "B" or "C". While returning from the press unit 3, the movable frame 24a cleans the parting face of the lower die 38 with the lower cleaner 39, and the resin dusts, etc. are sucked into the sucking duct 40.

Next, the movable supporting member 19 is moved along the rail 20 by the motor 22. Namely, the unloader 9 is moved on the conveying route 10 until the shaft 15 of the unloader 9 gets to the position "A" from the position "B" or "C". If necessary, the unloader 9 is rotated 90° by the motor 13.

Then the movable frame 24a is moved, by the motor 48, from the position "A" to the degating section 6a (see FIG.

1). The chucking hand 37 is downwardly moved to transfer the molded products to the degating section 6a. If the movement of the shaft 15 from the position "B" or "C" to the position "A" and the rotation of the unloader 9 are simultaneously executed, the cycle time of the molding machine can be shortened.

The disused solidified resin is removed from the molded products at the degating section 6a, then the molded products are conveyed by a conveying means (not shown) and accommodated in the accommodating magazine 6d (see FIG. 1) of the lead frame accommodating section 6.

The timing of the action of the movable frames 23a and 24a of the moving bodies 23 and 24 will be explained. When the movable frame 24a, which is chucking the molded products, is moved backward from the opened press unit 3 with cleaning the parting face of the lower die 38, the movable frame 23a, which is chucking the lead frames for the next molding cycle, is moved into the opened press unit 3 with cleaning the parting face of the upper die 27. Namely, the movable frames 23a and 24a are moved as if the movable frame 23a is replaced with the movable frame 24a in the space of the press unit 3. When the movable frame 24a chucking the molded products is moved out from the press unit 3, the lower die 38 is moved upward, and the chucking hand 26 of the movable frame 23a releases the lead frames and the resin tablets to set them in the lower die 38. When the movable frame 23a is also moved out from the press unit 3, the lower die 38 is further moved upward until reaching the upper die 27. After the dies are closed, the lead frames are molded, with the resin, in the dies.

Supplying the lead frames and taking out the molded products are seriesly executed, and cleaning the molding dies can be simultaneously executed with supplying the lead frames and taking out the molded products, so that the molding cycle time can be shortened.

The chucking hand 26 of the moving body 23 does not move vertically, so that the loader 8 can be vertically thinner and light. Since the loader 8 and the unloader 9 are vertically arranged, the movable frame 23a holding the lead frames locates quite distance from the lower die 38 when the movable frame 24a of the unloader 9 is moved out of the press unit 3, so the molding cycle time can be shortened by supplying the lead frames onto the lower die 38, which is moving upward for closing dies, without downwardly moving the chucking hand 26.

When the chucking hand 37 of the moving body 24 takes out the molded products, the chucking hand 37 is vertically moved because the molded products are ejected from the lower die 38 by ejector rods 91 (see FIG. 7) at the lowest position of the vertical stroke of the lower die 38. Namely, the chucking hand 37 must go to the lower die 38 located at the lowest position. The ejector rods 91 (see FIG. 7) are driven by the vertical movement of the movable platen 63, so no means for driving the ejector rods 91 is required.

The molded products are ejected at the lowest position of the lower die 38, so positions of the ejector rods 91 is restricted. If means for driving the ejector rods 91 is provided in the lower die 38, the chucking hand 39 need not be moved vertically. Namely, the ejector rods 91 are can eject the molded products without reference to the position of the movable platen 63, so that the unloader 9 may be arranged on the upper side of the loader 8.

Successively, the sucking ducts 30 and 41 of the loader 8 and the unloader 9 will be explained with reference to FIGS. 3A–3C.

The sucking ducts 30 and 41, which respectively have the sucking holes 29 and 40, are respectively arranged along the movable frames 23a and 24a. The sucking ducts 30 and 41 are respectively connected to rotary ducts 49 and 50, which are respectively provided in the frame sections 25 and 36 (see FIG. 3B). The rotary ducts 49 and 50 are capable of respectively rotating together with the shafts 14 and 15, so the sucking ducts 30 and 41 never entangle with the shafts 14 and 15.

Movable ducts 51 and 52 are attached to the movable supporting member 19 (see FIG. 3B and 3C). The movable ducts 51 and 52 respectively have sucking holes 53 and 54. When the loader 8 and the unloader 9 are rotated, the sucking holes 53 and 54 can be connected to one of two sucking holes 55 and 56, which are located on a moving course of the movable frames 23a and 24a, so that sucking action can be executed (see FIG. 3A).

For example, the sucking holes 53 and 54 are holes opened at tops of metallic spherical projections; the sucking holes 55 and 56 are holes opened at tops of rubber or plastic spherical projections. With this structure, the sucking holes 53 and 54 are pressed and connected to one of the sucking holes 55 and 56 when the loader 8 and the unloader 9 are rotated. The rubber or plastic spherical projections having the sucking holes 55 and 56 are elastically deformed, so that the ducts are air-tightly connected. Note that, the sucking holes 53 and 54 and the sucking holes 55 and 56 may be formed in the same material, e.g., metals, rubbers, as far as they can be air-tightly communicated.

Fixed ducts 57 and 58 are provided to the attaching member 18, to which the movable supporting member 29 is attached. The fixed ducts 57 and 58 are respectively connected to the movable ducts 51 and 52 by hoses 59 and 60. The fixed ducts 57 and 58 are connected to a dust collector, not shown (see FIG. 3B).

In the present embodiment, the loader 8 and the unloader 9 are vertically arranged, and they are respectively rotated, about the shafts 14 and 15, by the motors 12 and 13, so the loader unit 7 for conveying the works and the products can be compact in size, and the resin molding machine also can be compact in size.

While the moving body 24, which is holding the molded products, of the unloader 9 cleans the lower die 38 and moves away from the press unit 3, the moving body 23, which is holding the works to be molded, of the loader 8 enters the press unit 3 and cleans the upper die 27 as if the moving body 23 is replaced with the moving body 24 in the space of the opened press unit 3. With this action, the operating time for supplying the works and taking out the products can be shortened, and the molding cycle time of the resin molding machine can be shortened; a high speed molding machine can be realized.

In the present embodiment, the works, which is held by the moving body 23 of the loader 8, are supplied onto the lower die 38, which is upwardly moving to close. Namely, the works are supplied onto the lower die 38 at a mid position of the stroke of the lower die 38, so that the cycle time of the machine can be shortened.

Note that, the works and the products can be held by sucking means instead of the chucking hands 26 and 37.

(The Press Unit)

The press units 3 will be explained with reference to FIGS. 6A–7. Each press unit 3a–3d has a plurality of pots and plungers.

In FIG. 6A, a clamping mechanism 61 has a toggle mechanism 64, which connects the press base 62 and the movable platen 63 and which is driven by a servo motor 65. By driving the toggle mechanism 64, the molding dies are opened and closed (see FIG. 7). The lower die 38 is fixed to an attaching plate 66 of the movable platen 63. Thus, the lower die 38 is vertically moved by the motor 65. On the other hand, the upper die 27 is fixed to a fixed platen 67. A block 69 integrally connects the attaching plate 66 and a movable base plate 68, and they are vertically moved along guide posts 70 (see FIG. 6B).

A screw shaft 71 is vertically provided between the press base 62 and the movable base plate 68. A pulley 72 is fixed to a lower end of the screw shaft 71. A belt is engaged between the pulley 72 and a motor shaft of the motor 65, so that rotary torque of the motor 65 can be transmitted to the screw shaft 71. A nut 73 is screwed with the screw shaft 71, so the nut 73 is vertically moved by rotating the screw shaft 71. The toggle mechanism 64, which is connected to the movable platen 63, is connected to the nut 73, so that the movable platen 63 can be vertically moved by the toggle mechanism 64 and the nut 73. By the vertical movement of the movable platen 63, the dies of the press unit 3 are opened and closed.

The toggle mechanism 64 comprises a first link member 64a, a second link member 64b and a third link member 64c. Two pairs of toggle mechanisms 64, each of which comprises the link members 64a, 64b and 64c, are provided on both sides of the screw shaft 71, so there are four toggle mechanisms 64 are provided. One end of the first link member 64a is pivotably connected to the nut 73 by a shaft 74a; the other end of the first link member 64a is pivotably connected to the second link member 64b by a shaft 74b. One end of the second link member 64b is pivotably connected to the press base 62 by a shaft 74c; the other end of the second link member 64b is pivotably connected to the third link member 64c by a shaft 74d. The third link member 64c is pivotably connected to the movable platen 63 by a shaft 74e. When the screw shaft 71 is rotated by the motor 65 to vertically move the nut 73, the second and third link members 64b and 64c are upwardly extended and retracted by the first link member 64a, so that the movable platen 63 is vertically moved to open and close the dies.

A transfer mechanism 75 vertically moves the plungers 76 to exert melted resin in the pots of the lower die 38. As shown in FIG. 7, a servo motor 77 for driving the transfer mechanism 75 is provided in the fixed upper platen 67. And as shown in FIGS. 6A and 6B, two sets of a screw shaft 78b and a spline shaft 78a which is connected to the upper end of the screw shaft 78b are rotatably provided between the platens 63 and 67, and they are vertically moved with the vertical movement of the movable platen 63. Each spline shaft 78a is covered with a cover 78c. The spline shaft 78a is capable of vertically moving in the cover 78c. An outer circumferential face of the spline shaft 78a and an inner circumferential face of the cover 78c are mutually engaged, so that driving force can be transmitted.

Timing pulleys 79 are respectively fixed to upper ends of the two covers 78c, and a timing belt 80 is engaged between the timing pulleys 79 and a motor shaft of the motor 77, so that rotary torque of the motor 77 is transmitted to the spline shafts 78a and the screw shafts 78b by the covers 78c. In the state of closing dies in which the movable platen 63 has been moved upwardly, and in the state of opening dies in which the movable platen 63 has been moved downwardly, the motor 77 (see FIG. 7) rotates the motor shaft, the pulleys 79, the covers 78c, the spline shafts 78a and the screw shafts 78b, so that the plungers 76 can be moved vertically.

Nuts 81 are respectively screwed with the two screw shafts 78, and the nuts 81 are attached to a unit plate 82 (see FIG. 6A). A pressure equalizing unit 85, which includes a plate 83 and a block 84, is attached on the unit plate 82. The block 84 can be slidably pulled out from the plate 83 (see FIG. 6A). Two guide shafts 82a are pierced through the unit plate 82 so as to guide vertical movement thereof (see FIG. 6B). There are formed holes 82b, which prevent interference with a supporting block 69 of the movable platen 63 when the unit plate 82 moves vertically, on both sides of the plate 83 (see FIG. 6B). The nuts 81 are vertically moved together with the unit plate 82 when the screw shafts 78b are rotated, so that the pressure equalizing unit 85 is vertically moved together with the unit plate 82.

In the resin molding machine of the present embodiment, a plurality of the pots are formed in a molding section (not shown) of the lower die 38 of each press unit 3. The plunger 76 is provided in each pot. When the melted resin is filled in cavities of the molding dies, all the plungers 76 are upwardly moved to exert the melted resin in all pots. The pressure of the melted resin in all pots can be equalized by biasing force of a spring or hydraulic (oil) pressure. The pressure equalizing unit 85 equalized the resin pressure by the oil pressure. By employing the pressure equalizing unit 85 including a closed oil circuit, the resin pressure in all pots can be equal even if the amount of the resin is not equal in each pot. In the pressure equalizing unit 85, a plurality of the plungers 76 are linearly arranged in the longitudinal direction of the unit 85, and they are respectively connected to piston rods 86, which are arranged to correspond to each pot of the lower die 38. With this structure, the plungers 76 are capable of slightly moving in the vertical direction together with the piston rods 86. The piston rods 86 of the pressure equalizing unit 85 are equally exerted by oil in the closed oil circuit. Note that, water, glycerine, etc. may be filled in the closed circuit of the pressure equalizing unit 85 instead of the oil. The glycerine is a preferable liquid due to heat-and compression-resisting properties.

In the present embodiment, the pressure equalizing unit 85 has means for adjusting pressure. As shown in FIG. 6C, a press rod 87 is pushed by a driving source "M", e.g., a servo motor, to push an adjusting rod 88. When the adjusting rod 88 is pushed upward, the oil in a cylinder 89 is moved into the block 84, then the plungers 86, which are commonly connected to a connecting member 90 in the block 84, are simultaneously moved upward. With this structure, the resin pressure in all pots can be equal.

Note that, the oil in the block 84 of the pressure equalizing unit 85 may be previously applied predetermined pressure as shown in FIG. 6D.

In FIGS. 6C and 6D, no coupler for connecting to a oil feeding pipe is required when the pressure equalizing unit 85 is exchanged. Namely, the oil is sealed up in the closed circuit, so this pressure equalizing unit 85 can be preferably employed in the clean room.

In the case of driving the adjusting rod 88 by a hydraulic system, an oil tank can be small because the clamping mechanism 61 and the transfer mechanism 75 are driven by the motors 65 and 77.

In the case that the pressure equalizing unit 85 has an external oil adjusting circuit, an oil pipe for circulating the oil from an oil tank (not shown) in the press unit 3 is preferably connected with an oil port (not shown) of the pressure equalizing unit 85 by a coupler so as to easily exchange the pressure equalizing unit 85.

To mold the lead frames, the lead frames are clamped between the upper die 27 and the lower die 38 by the clamping mechanism 61, then the plungers 76 are pushed upward by the motor 77, so that the melted resin in the pots of the lower die 38 is filled in the cavities.

Note that, if there are a plurality of molding sections in each lower die 38, the transfer mechanism 75 has a plurality of the pressure equalizing units 85, each of which corresponds to each molding section.

Figure 7:
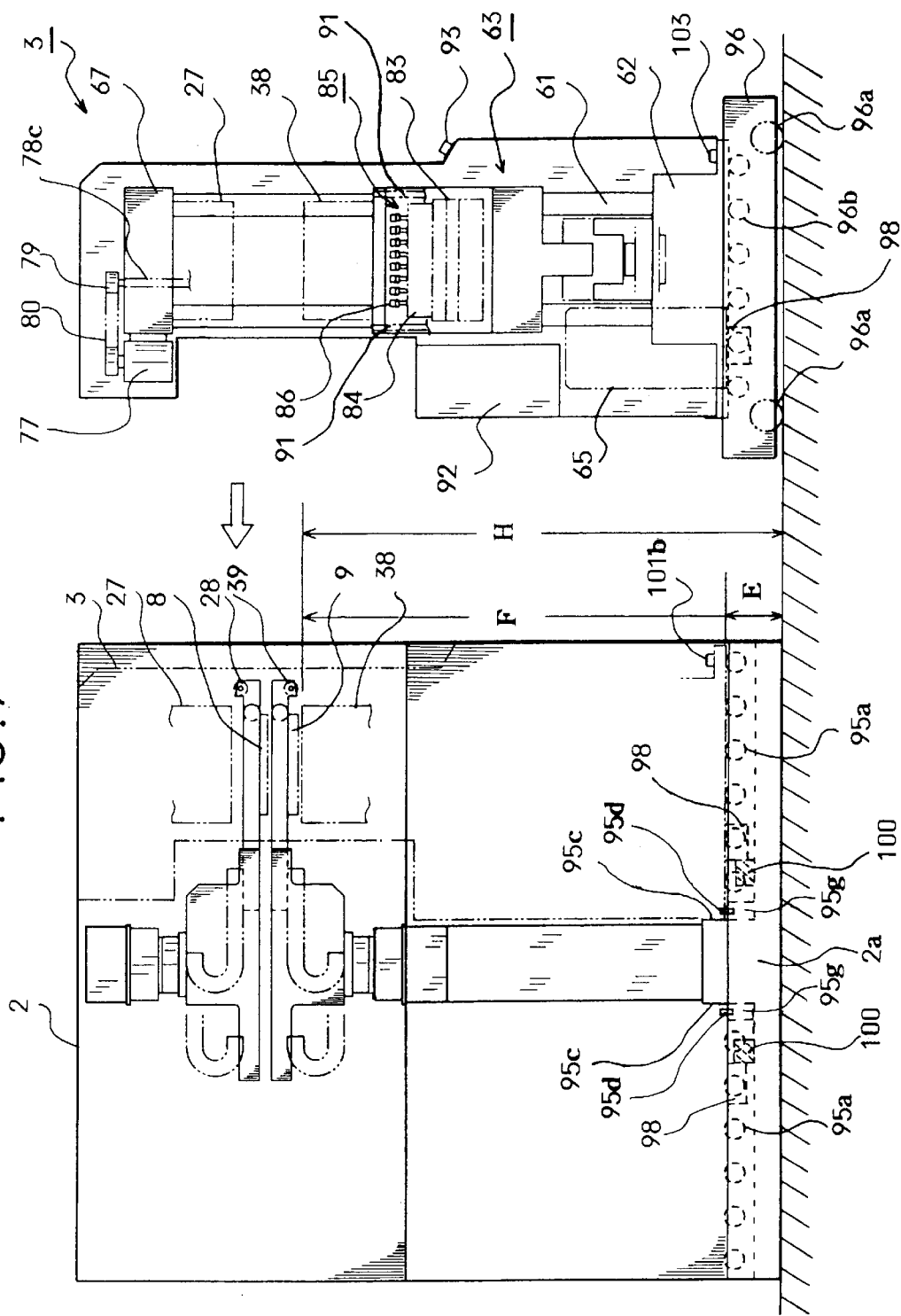
FIG. 7 is a right side view of a base unit with the press unit.

In FIG. 7, the ejector rods 91 project ejector pins from inner faces of the cavities of the dies when the upper die 27 and the lower die 38 are opened. The ejector rods 91 contact bottom faces of ejector pin plates (not shown) in the lower die 38 when the dies 27 and 38 are opened. The ejector rods 91 are vertically pierced through the movable platen 63. When the movable platen 63 is downwardly moved to open the dies 27 and 38, the bottom faces of the ejector pin plate contact the ejector rods 91. And the movable platen 63 is further moved downwardly, then upper ends of the ejector rods 91 project from an upper face of the movable platen 63, so that the ejector pin plates are relatively moved upward.

A press control section 92 controls the motor 65 for driving the clamping mechanism 61, the motor 77 for vertically moving the transfer mechanism 75, and resin molding action on the basis of input signals, which are inputted by an operating section 93 located on the right side (see FIG. 7) of the press unit 3.

In FIG. 6A, the pressure equalizing unit 85 is attached to the unit plate 82 and capable of sliding toward the front side. Concretely, the plate 83 has a T-shaped groove, and a part of the block 84 is slidably fitted in the T-shaped groove. With this structure, the block 84 is capable of sliding, along said groove of the plate 83, in the longitudinal direction thereof (the direction perpendicular to the paper face of FIG. 6A) so as to attach to and detached from the plate 83.

When the pressure equalizing unit 85 is assembled to and disassembled from the movable platen 63, the plungers 76 are disconnected from the piston rods 86. In the case of assembling the pressure equalizing unit 85 to the movable platen 63, for example, firstly the pressure equalizing unit 85 is attached to the unit plate 82, and the lower die 38 is set at a prescribed position on the movable attaching plate 66. Then the plungers 76 are inserted into each pot from an upper opening section and connected to the piston rod 86.

In the case of exchanging or repairing the molding dies, for example, the pressure equalizing unit 85 can be easily disassembled by detaching a fewer number of parts because the oil of the pressure equalizing unit 85 exists in the closed oil circuit only. And working space can be kept in the movable platen 63, so working efficiency can be raised.

Next, an attaching mechanism of the press units 3 will be explained with reference to FIGS. 7–8D. In FIG. 8A, each unit attaching section 94, which is provided on the base 2a of the base unit 2, has a plurality of rollers 95a for supporting and conveying the press unit 3. The rollers 95a are rotatably arranged, in the direction of attaching and detaching the press unit 3, in each unit attaching section 94. The rollers 95a are slightly projected from a unit supporting face 95b of the unit attaching section 94. A contact section 95c is provided at inner most position of each unit attaching section 94. The contact section 95c contacts the press base of each press unit 3 and correctly positions the press unit 3 as positioning means when the press unit 3 is attached to the unit attaching section 94. There are two positioning pins 95d as another positioning means in the vicinity of each contact section 95c. There are two engaging section 62a, which are capable of engaging with the positioning pins 95d, at a front end of the press base 62 of each press unit 3. By making the press base 62 contact with the contact section 95c and engaging the engaging sections 62a with the positioning pins 95d, each press unit 3 can be correctly positioned, in the longitudinal direction and the transverse direction, on the unit attaching section 94.

The positioning pins 95d are loosely engaged with the engaging sections 62a, so the press unit 3 is capable of slightly moving in the attaching and detaching direction (see FIG. 8D). As shown in FIG. 8A, guide rails 95e are provided on both side edges of each attaching section 94, so the press unit 3 can be guided for attaching to and detaching from the attaching section 94. Note that, the transverse position of the press unit 3 in the attaching section 94 may be defined by the guide rails 95e in stead of the positioning pins 95d.

In FIG. 7, the height between an upper face of the attaching section 94 and a bottom face of the press unit 3, which will be supported by the rollers 95a is defined as "E"; height between the bottom face of the press unit 3 and the parting face of the lower die 38 is defined as "F". In the present embodiment, the height "H" between the upper face of the attaching section 94 and the parting face of the lower die 38 (H=E+F) is fixed even if the molding dies are exchanged to mold other products. Note that, height between the loader 8 and the unloader 9 of the base unit 2 and the parting face of the dies of the press unit 3 should be relatively adjusted before operation.

The rollers 95a in the attaching sections 94 directly support the press units 3, so the rollers 95a will be abraded. To avoid the abrasion and deformation of the rollers 95a, the rollers 95a may retract under the upper faces 95b of the attaching sections 94 after attaching the press units 3. In this case the press units 3 are supported by the upper faces (horizontal faces) 95b, the height of the press units 3 can be correctly set in the attaching sections 94. Note that, a ball conveyor means, for example, can be employed instead of the rollers 95a. The ball conveyor means (not shown) comprises: a frame; and a plurality of metallic balls for rotatably supporting the press unit 3, the metallic balls being enclosed in the frame.

By the rollers 95a or the ball conveyor means, the press units 3 can be easily and quickly handled and positioned.

Each press unit 3 is positioned by a positioning jig (not shown). By the positioning jig, horizontal position and the height "H=E+F" of the press unit 3 can be correctly defined to perfectly fit in the attaching section 94 (see FIG. 7). The positioning jig is designed on the basis of size of the base 2a of the base unit 2. To correspond to another base unit 2, the positioning jig has means for adjusting the horizontal position and height of the press units 3 according to the size of the attaching sections 94 of the base unit 2. In the case of making a plurality of base units 2, the positions of the attaching sections 94 may be correctly positioned by attaching a press unit jig, whose size is equal to the press unit 3, to the attaching sections 94 of the base unit 2. Note that, the press unit jig may be used for adjusting the positioning jig for correctly positioning the press units 3.

A flatcar 96 (see FIG. 7), whose height of an upper face is equal to that of the supporting faces 95b of the attaching sections 94, may be used as the press unit jig. There are rollers 96a on a bottom face of the flatcar 96; there are rollers 96b on an upper face thereof. When the press unit 3 is conveyed by the flatcar 96, the press unit 3 is mounted on the upper face of the flatcar 96 and fixed thereon by bolts 103. When the flatcar 96 gets to the base unit 2, the bolts 103 are detached, then the press unit 3 is pushed toward the base unit 2. The press unit 3 is transferred onto the rollers 95a of the supporting face 95b, and further pushed until contacting the contact section 95c. Upon contacting the contact section 95c, the press unit 3 is correctly set in the attaching section 94.

A mechanism for fixing the press unit 3 in the attaching section 94 will be explained with reference to FIG. 8. If the movable platen 63 is moved at high speed after the press units 3 are attached in the attaching sections 94, vibration occurs. By the vibration, the press units 3 are made unstable in the attaching sections 94 because the movable platen 63 including the molding dies is very heavy. Thus, the fixing mechanism preferably has means for preventing the press base 62 from floating. In the present embodiment, horizontal bolts 97 are employed as the preventing means (see FIG. 8A).

As shown in FIGS. 8A and 8B, there are formed two engaging sections 62a at the inner end of the press base 62 of each press unit 3. And there is provided a positioning pin block 95g in the vicinity of the contact section 95c of each attaching section 94; there are vertically provided two positioning pins 95d on each positioning pin block 95g. Upon attaching the press unit 3 in the attaching section 94, the engaging sections 62a engage with the positioning pins 95d. There are provided two horizontal bolts 97 on a bottom of the press unit 3. The horizontal bolts 97 are separated in the transverse direction of the press unit 3. Front ends of the horizontal bolts 97 are rotatably held by blocks 98; rear ends of the horizontal bolts 97 are rotatably held by blocks 99. The horizontal bolts 97 are held between the blocks 98 and 99 by washers 97a. Each attaching section 94 has stopper blocks 100. When the press unit 3 is attached in the attaching section 94, the blocks 98 contact the stopper blocks 100, then the horizontal bolts 97 are rotated to screw with the stopper blocks 100. By screwing with the stopper blocks 100, the horizontal bolts 97 position the press unit 3 and prevent the press base 62 from floating. Note that, the stopper blocks 100 may be employed as means for positioning the press unit 3.

As shown in FIG. 8A, a rear end of each press unit 3 is fixed to the attaching section 94 by two vertical bolts. One of the vertical bolts is an ordinary bolt 101a (on the right side) whose outer circumferential face is wholly made as a screw section; the other bolt 101b (on the left side) has an outer circumferential face whose front part is only made as a screw section (see FIG. 8C). The bolt 101b act as a sub positioning means. The press base 62 of each press unit 3 has two screw holes 102a and 102b, which respectively correspond to the bolts 101a and 101b. There is formed a screw hole (not shown), which is communicated with the screw hole 102a, in the supporting face 95b of each attaching section 94. In FIG. 8C, there is formed a hole 95h, which is communicated with the screw hole 102b, in the supporting face 95b of each attaching section 94. There is provided a nut 95i at a lower part of the hole 95h. The bolt 101a is screwed and pierced through the screw hole 102a, and screwed and fixed to the screw hole (not shown) of the supporting face 95b. The bolt 101b is pierced through the holes 102b and 95h, and screwed with the nut 95i, so that the press unit 3 is fixed (see FIG. 8C).

The bolts 101a and 101b are attached at predetermined positions in the press unit 3, so that a plurality of press units 3 can be attached to each attaching section 94.

In the present embodiment, the bolts 101a and 101b are different bolts, but both bolts may be the bolt 101a.

To fix the press unit 3 in the attaching section 94, the press unit 3 is previously mounted on the flat car 96, on which the height of the press unit 3 is correctly set, as shown in FIG. 7. Then the flatcar 96 is moved beside the attaching section 94 together with the press unit 3. The press unit 3 is pushed onto the attaching section 94 to set thereon. When the press unit 3 is pushed along the guide rails 95e as shown in FIG. 8B, the engaging sections 62a engage with the positioning pins 95d, and the front end of the press base 62 of the press unit 3 contacts the contact section 95c. At that time, the blocks 98 on the bottom of the press unit 3 contact the stopper blocks 100. The bolt 101b is inserted into the holes 102b and 95h to position the press unit 3. If necessary, the two horizontal bolts 97, which are provided on the bottom of the press unit 3, are screwed with the stopper blocks 100 to fix after the rollers 95a are retracted. Further the bolt 101a is screwed with the screw hole 102a; the bolt 101b is screwed with the screw hole 102b, so that the vertical position of the press unit 3 is fixed (see FIG. 8C). With the above described structures, the press unit 3 can be precisely fixed in the attaching section 94, so that the press base 62 does not float by the vibration even if the movable platen 63 is moved at high speed. After the press unit 3 is mechanically fixed to the base unit 2, the press unit 3 is electrically connected with the base unit 2.

Note that, the press units 3 can be attached to and detached from the base unit 2 without reference to the existence of the molding dies.

Each press unit 3 is capable of independently being attached to and detached from the base unit 2 and has a molding function only, so that the press units 3 can be small and light. Since the press units 3 are small and light, they can be easily handled and carried for maintenance, etc. Further, the press units 3 can be carried into and out from the clean room without widely opening the clean room. Since the press units 3 have the molding function only, they can be attached to the base unit 2 without connecting to the loader unit 7. Namely, the press units 3 can be attached by setting on the attaching sections 94 only, so the working efficiency of exchanging the press units 3 can be raised.

In each press unit 3, the closed oil circuit is formed in the pressure equalizing unit 85 only; the clamping mechanism 61 and the transfer mechanism 75 are driven by the electric motors, so the press unit 3 can be small and light. In comparison with the hydraulic clamping mechanism and the hydraulic transfer mechanism, the clamping mechanism 61 and the transfer mechanism 75 can be more precisely and quickly controlled by the electric motors. Further, changing press speed can be executed without shock. Even if the amount of the resin in the pots are not equal, the pressure unbalance can be absorbed by the pressure equalizing units 85, so that the works can be equally molded with equal resin pressure.

In the present embodiment, the closed oil circuits are formed in the pressure equalizing units 85 only, so external oil tank and pipings can be omitted, so the press units 3 can be small and light. Further, the press units 3 are capable of keeping the clean room clean.

Figure 9:
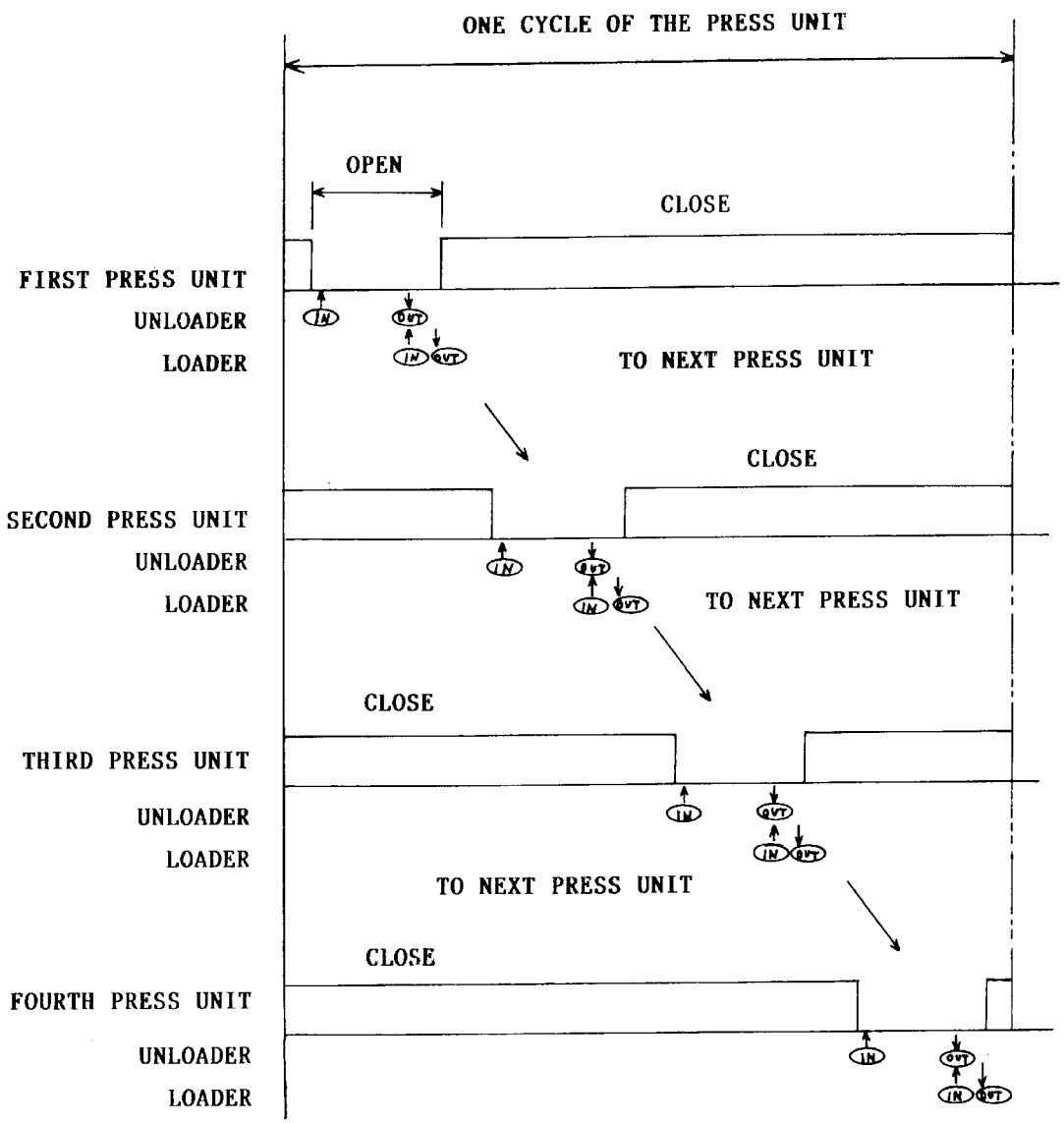
FIG. 9 is a timing chart showing action of the loader and the unloader in one molding cycle.

The action of the resin molding machine 1 including the action of the press units 3 and the loader unit 7 will be explained with reference to FIG. 9.

In the present embodiment, four press units 3a–3d act clamping action; the loader unit 7 conveys the works and the molded products between the base unit 2 and the press units 3.

The lead frames "L" and the resin tablets have been set in the press units 3a–3d. One molding cycle including the action of the press units 3a–3d, whose timing of opening and closing the dies are different, and the conveying action of the loader unit 7.

Firstly, the upper die 27 and the lower die 38 of the first press unit 3a is closed to mold the lead frames "L". Afterwards the toggle mechanism 61 is driven by the motor 65 to move the movable platen 63 downward, so that the upper die 27 and the lower die 38 are opened. The unloader 9, whose cleaner 39 is separated away from the parting face of the lower die 38, enters the space between the dies 27 and 38 and chucks the molded lead frames "L". The unloader 9 holding the molded lead frames "L" moves out from the space. When the unloader 9 moves out therefrom, the unloader 9 cleans the parting face of the lower die 38 by the cleaner 39. While the action of the unloader 9, the loader 8 chucks the lead frames "L" to be molded, which are supplied from the lead frame supplying section 4, and the resin tablets, which are supplied from the resin supplying section 5, at the home position "A", then the loader 8 moves to the position "B" via the conveying route 10 (see FIG. 1).

When the unloader 9 begins to leave the space of the dies 27 and 38 of the first press unit 3a, the loader 8 holding the lead frames "L" and the resin tablets enters the space. At that time, the loader 8 brushes and cleans the parting face of the upper die 28 by the cleaner 28. When the unloader 9 gets out of the space, the motor 65 (see FIG. 7) moves -the movable platen 63 upward to move the lower die 38 close to the loader 8. Then the loader 8 sets the lead frames "L" and the resin tablets onto the lower die 38. When the loader 8 gets out of the space, the motor 65 further moves the movable platen 63 upward to close the dies 27 and 38 to mold the lead frames When the loader 8 enters the space of the dies 27 and 38 of the first press unit 3a, the unloader 9 holding the molded products "L" moves to the position "A" of the base unit 2 via the conveying route 10 to transfer the molded products "L" to the degating section 6a. Then the unloader 9 returns to the position "B" via the conveying route 10 for stand-by. The unloader 9 waits for opening the dies of the second press unit 3b. Upon opening the dies of the second press unit 3b, the unloader 9 enters the space of the second press unit 3b. Then the cylinder 46 of the unloader 9 is driven to move the chucking hand 38 downward to chuck the molded lead frames "L". Then the unloader 9 holding the molded products "L" moves out of the space with cleaning the lower die 38 by the cleaner 39.

Upon moving out of the space between the dies 27 and 38 of the first press unit 3a, the loader 8 moves to the position "A" while the unloader 9 stays in the space of the dies 27 and 38 of the second press unit 3b. At the position "A", the loader 8 chucks the lead frames "L", which have been supplied from the lead frame supplying section 4, and the resin tablets, which have been supplied from the resin supplying section 5, and moves to the position "B" for stand-by via the conveying route 10. When the unloader 9 begins to move outward from the space between the dies, the loader 8 enters the space with cleaning the upper die 27 by the cleaner 28. When the unloader 9 gets out of the second press unit 3b, the loader 8 sets the lead frames "L" and the resin tablets onto the lower die 38, which have been further moved upward, and moves outward. When the loader 8 gets out of the space, the motor 65 moves the movable platen 63 upward to close the dies 27 and 38 to mold the lead frames "L".

When the loader 8 enters the space of the dies 27 and 38 of the second press unit 3b, the unloader 9 holding the molded products "L" moves to the position "A" of the base unit 2 via the conveying route 10 to transfer the molded products "L" to the degating section 6a. Then the unloader 9 returns to the position "B" via the conveying route 10 for stand-by. The unloader 9 waits for opening the dies of the third press unit 3c. Upon opening the dies of the third press unit 3c, the unloader 9 enters the space of the third press unit 3c. Then the cylinder 46 of the unloader 9 is driven to move the chucking hand 38 downward to chuck the molded lead frames "L". Then the unloader 9 holding the molded products "L" moves out of the space and cleans the lower die 38 by the cleaner 39.

Upon moving out of the space between the dies 27 and 38 of the second press unit 3b, the loader 8 moves to the position "A" while the unloader 9 stays in the space of the dies 27 and 38 of the third press unit 3c. At the position "A", the loader 8 chucks the lead frames "L", which have been supplied from the lead frame supplying section 4, and the resin tablets, which have been supplied from the resin supplying section 5, and moves to the position "B" for stand-by via the conveying route 10. When the unloader 9 begins to move outward from the space between the dies, the loader 8 enters the space and cleans the upper die 27 by the cleaner 28. When the unloader 9 gets out of the third press unit 3c, the loader 8 sets the lead frames "L" and the resin tablets onto the lower die 38, which have been further moved upward, and moves outward. When the loader 8 gets out of the space, the motor 65 moves the movable platen 63 upward to close the dies 27 and 38 to mold the lead frames "L".

When the loader 8 enters the space of the dies 27 and 38 of the third press unit 3c, the unloader 9 holding the molded products "L" moves to the position "A" of the base unit 2 via the conveying route 10 to transfer the molded products "L" to the degating section 6a. Then the unloader 9 returns to the position "C" via the conveying route 10 for stand-by. The unloader 9 waits for opening the dies of the fourth press unit 3d. Upon opening the dies of the fourth press unit 3d, the unloader 9 enters the space of the fourth press unit 3d. Then the cylinder 46 of the unloader 9 is driven to move the chucking hand 38 downward to chuck the molded lead frames "L". Then the unloader 9 holding the molded products "L" moves out of the space with cleaning the lower die 38 by the cleaner 39.

Upon moving out of the space between the dies 27 and 38 of the third press unit 3c, the loader 8 moves to the position "A" while the unloader 9 stays in the space of the dies 27 and 38 of the fourth press unit 3d. At the position "A", the loader 8 chucks the lead frames "L", which have been supplied from the lead frame supplying section 4, and the resin tablets, which have been supplied from the resin supplying section 5, and moves to the position "C" for stand-by via the conveying route 10. When the unloader 9 begins to move outward from the space between the dies, the loader 8 enters the space with cleaning the upper die 27 by the cleaner 28. When the unloader 9 is removed from out of the fourth press unit 3d, the loader 8 sets the lead frames "L" and the resin tablets onto the lower die 38, which have been further moved upward, and moves outward. When the loader 8 is removed from the space, the motor 65 moves the movable platen 63 upward to close the dies 27 and 38 to mold the lead frames "L".

As described above, one molding cycle is executed by the four press units 3. Unlike the present embodiment, the number of the press unit(s) may be 1–3 or 5 or more according to amount of production, etc.

In the present embodiment, a plurality of the press units 3 are independently attached to and detached from the base unit 2, so the press unit 3 can be solely detached from the base unit 2. With this structure, the press unit 3 can be cleaned, repaired, exchanged, used for manual molding executed by respectively controlling the press unit, etc. without stopping the whole machine, so that working efficiency can be raised.

Second Embodiment

Next, a Second Embodiment will be explained with reference to FIG. 10. Note that, the members explained in the First Embodiment are assigned the same symbols, and explanation will be omitted.

In the First Embodiment, the base unit 2 has the conveying route 10 for conveying the works and the products, so the base unit 2 is formed into a T-shape. In the Second Embodiment, the base unit 104 is formed into a rectangular parallelepiped.

Figure 10:
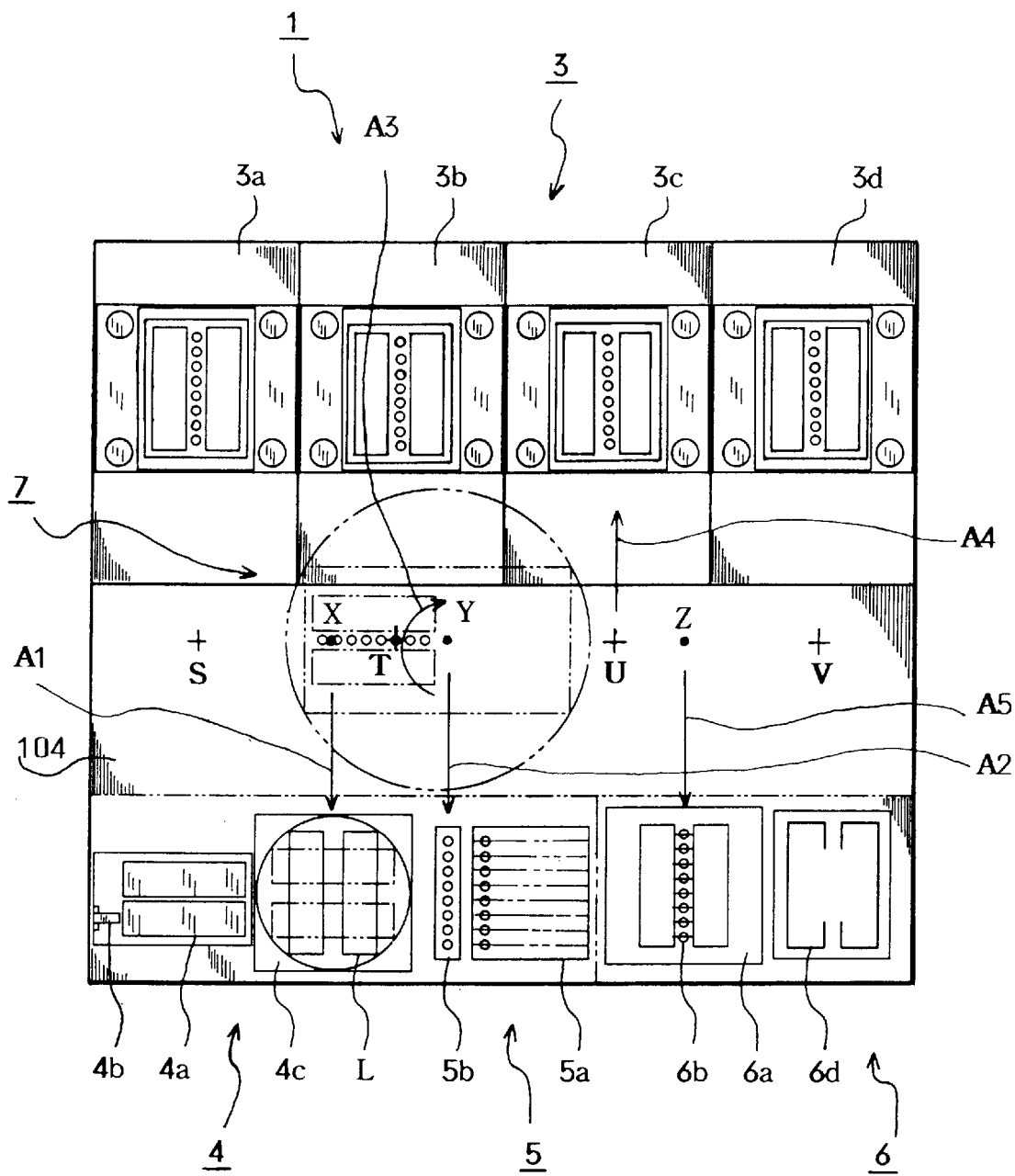
FIG. 10 is a plan view of a the resin molding machine of Second Embodiment.

In FIG. 10, a base unit 104 has: the lead frame supplying section 4 for supplying one or a plurality of the lead frames "L" at one time; a resin supplying section 5 for supplying one of a plurality of resin tablets at one time; a lead frame accommodating section 6 for accommodating the molded lead frames "L" (products); and the loader unit 7 including the loader (not shown) for conveying the lead frames "L" to be molded and the resin tablets from the lead frame supplying section 4 and the resin supplying section 5 to the press units 3, and the unloader (not shown) for conveying the molded products from the press units 3 to the lead frame accommodating section 6, as well as the base unit 2 of the First Embodiment.

The position at which the loader (not shown) chucks the lead frames "L" to be molded and the resin tablets and the position at which the unloader (not shown) accommodates the molded products are different from those of the First Embodiment.

In the present embodiment, the loader (not shown) moves, in a direction A1, from a position "X" to the supplying table 4c to chuck the lead frames "L". Upon chucking the lead frames "L", the loader returns to the position "X". Then the loader moves to a position "Y", then the loader moves, in a direction A2, from the position "Y" to the holder 5b to chuck the resin tablets. Upon chucking the resin tablets, the loader returns to the position "Y". At the position "Y", the loader rotate 90° in a direction A3 to correspond the arrangement of the lead frames and the resin tablets to the arrangement of the lower die of the press unit 3. Then the loader moves to one of positions "S", "T", "U" and "V", and moves in a direction A4 to supply the lead frames "L" and the resin tablets onto the selected lower die.

The unloader chucks the molded products in the press unit 3, then moves to a position "Z". At the position "Z", the unloader rotates 180° and moves, in the direction A5, to the degating section 6a so as to transfer the molded products. At the degating section 6a, the disused resin 6b, e.g., culls, runners, gates, are removed from the molded products "L" and collected. The molded products "L" are conveyed and accommodated in the accommodating magazine 6d by a proper means (not shown), e.g., a pick up unit.

The loader unit 7 rotates at the positions "X", "Y" and "Z" so as to supply the lead frames to the press units 3 and so as to accommodate the molded products in the lead frame accommodating section 6.

In the Second Embodiment, a plurality of the press units 3 are independently attached to and detached from the base unit 2, so the press unit 3 can be solely detached from the base unit 2. With this structure, the press unit 3 can be cleaned, repaired, exchanged, used for manual molding, etc. without stopping the whole machine, so that working efficiency can be raised as well as the First Embodiment.

Third Embodiment

A Third Embodiment will be explained with reference to FIG. 11. Note that, the members explained in the First Embodiment are assigned the same symbols, and explanation will be omitted.

Figure 11:
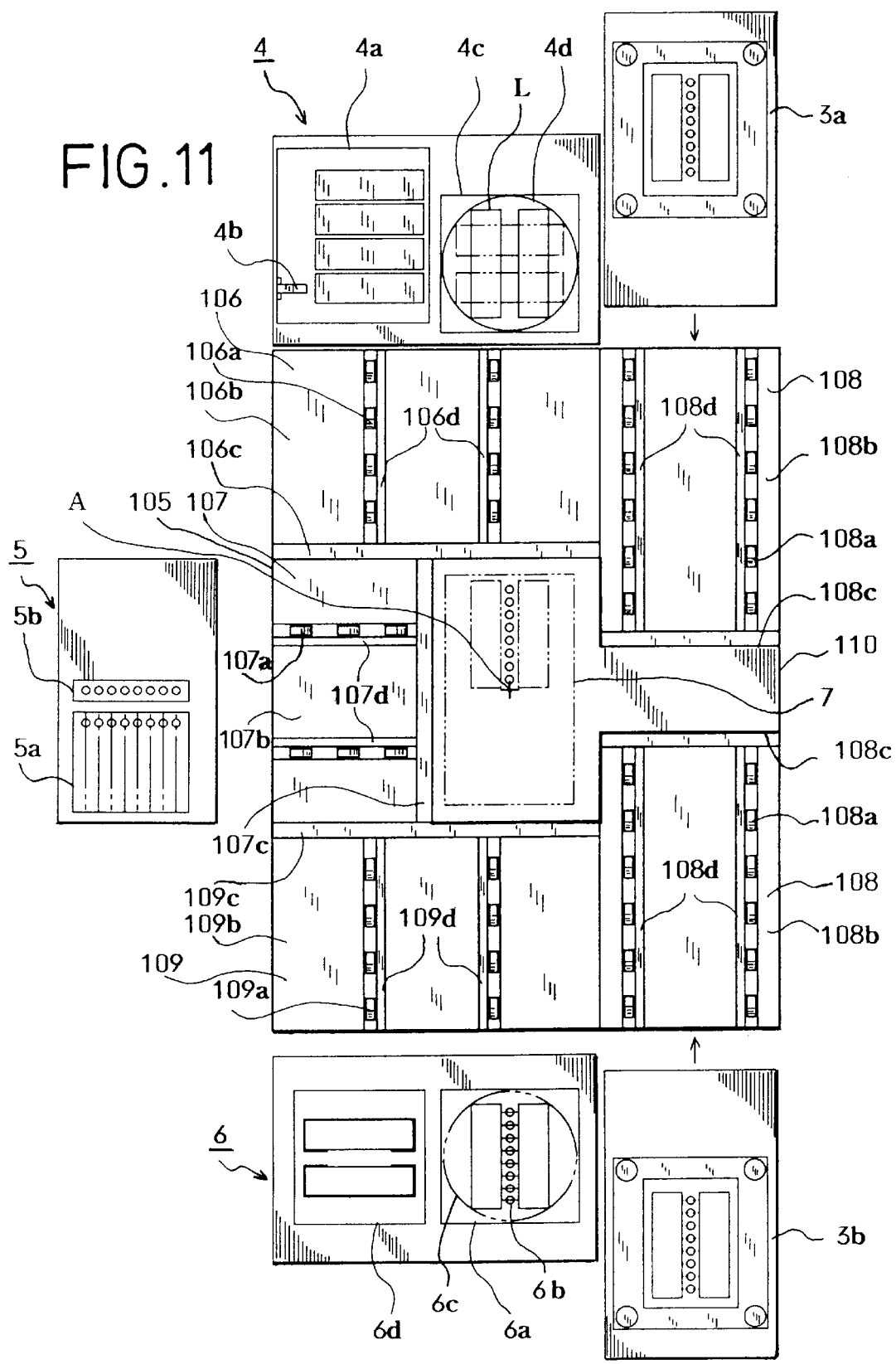
FIG. 11 is a plan view of a the resin molding machine of Third Embodiment, in which all units are detached from the base unit.
Figure 12:
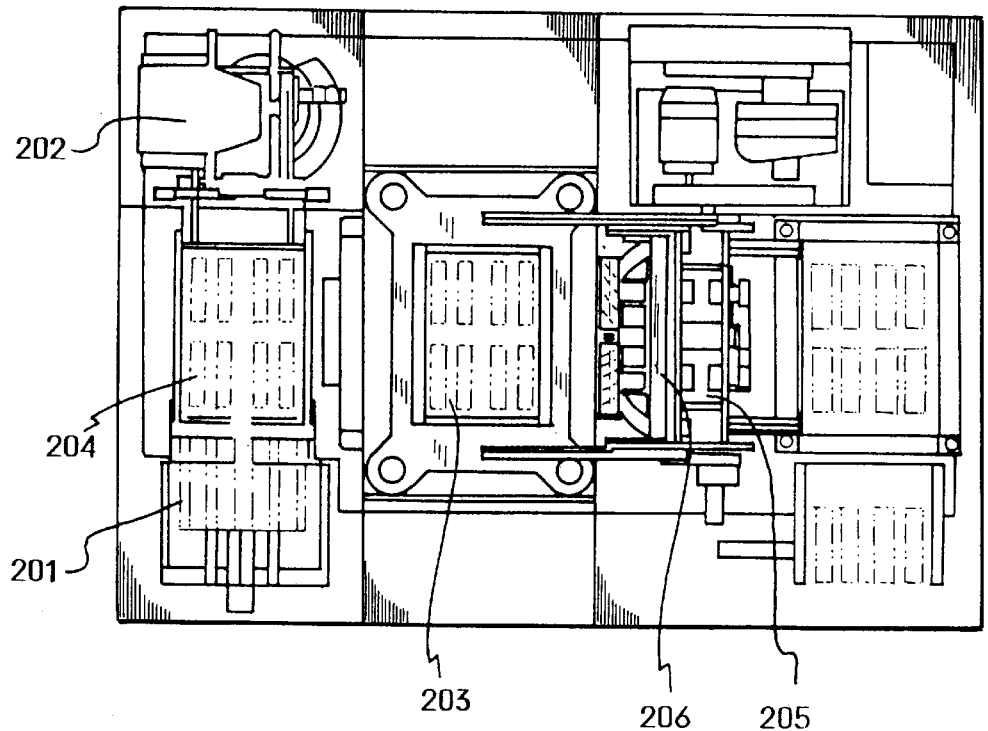
FIG. 12 is a plan view of the conventional resin molding machine.
Figure 14:
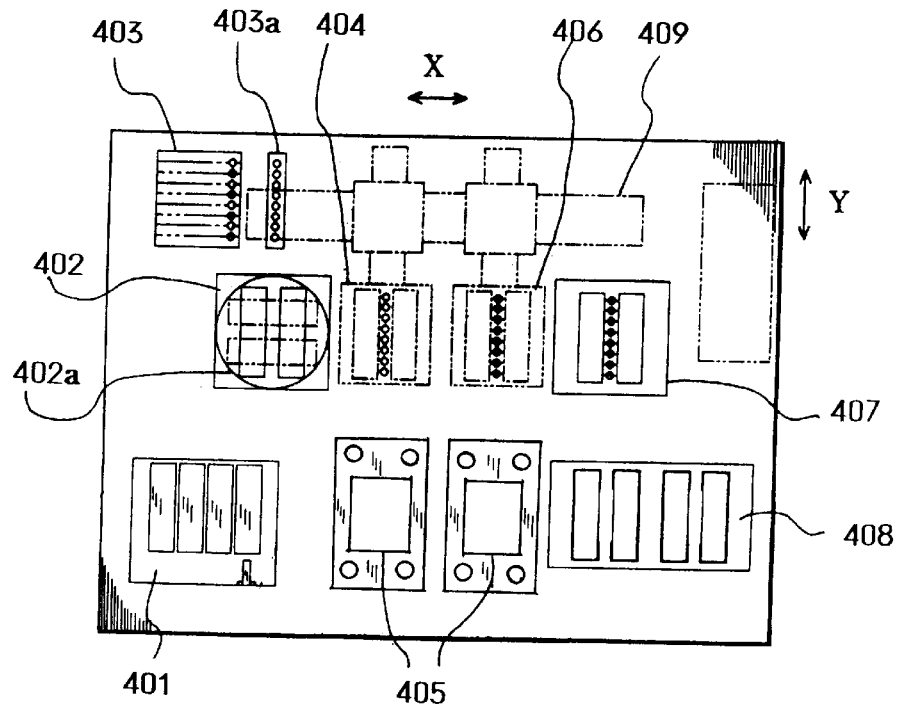
FIG. 14 is a plan view of another conventional resin molding machine.
Figure 13:
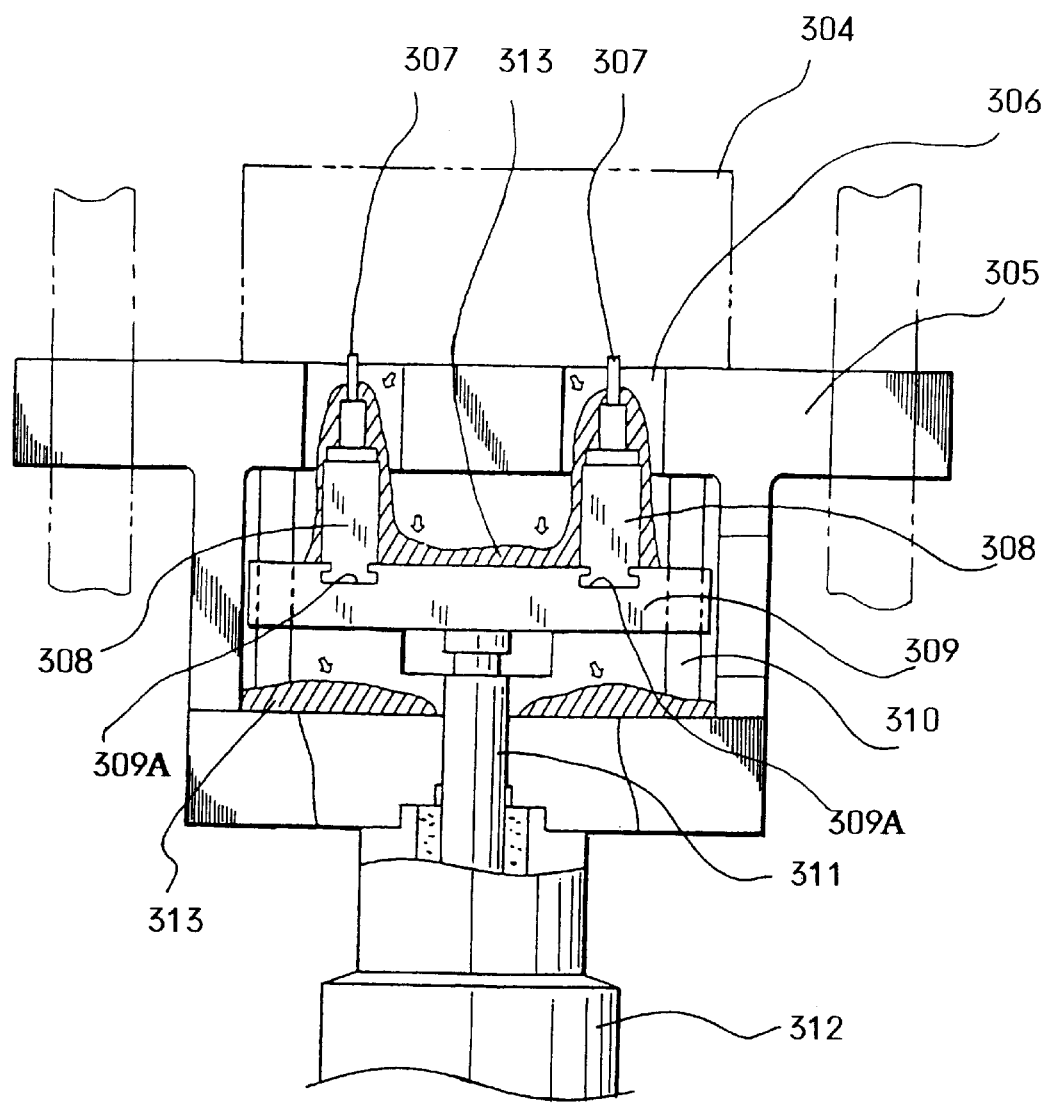
FIG. 13 is a partial front view of the transfer mechanism of the conventional resin molding machine.

As shown in FIG. 11, a base unit 105 has the loader unit 7 including the loader and the unloader, which are vertically arranged therein. The lead frame supplying section 4, the resin supplying section 5, the press units 3a and 3b, and the lead frame accommodating section 6, each of which are detachably attached to the base unit 105, are arranged to enclose the home position "A" of the loader unit 7. The lead frame supplying section 4, the resin supplying section 5, the press units 3a and 3b, and the lead frame accommodating section 6 can be solely attached to and detached from the base unit 105. The loader unit 7 conveys the lead frames to be molded and the resin tablets from the lead frame supplying section 4 and the resin supplying section 5 to the press units 3a and 3b, and conveys the molded products from the press units 3a and 3b to the lead frame accommodating section 6.

The base unit 105 has: an attaching section 106 to which the lead frame supplying section 4 is detachably attached; an attaching section 107 to which the resin supplying section 5 is detachably attached; attaching sections 108 to which the press units 3a and 3b are respectively detachably attached; and an attaching section 109 to which the lead frame accommodating section 6 is detachably attached. The attaching sections 106, 107, 108 and 109 respectively have unit supporting faces 106b, 107b, 108b and 109b. And rollers 106a, 107a, 108a and 109a are respectively rotatably provided on the supporting faces 106b, 107b, 108b and 109b. The rollers 106a, 107a, 108a and 109a are arranged, in the direction of attaching and detaching direction, on each supporting face.

The attaching sections 106, 107, 108 and 109 respectively have contact sections 106c, 107c, 108c and 109c, each of which is provided at the innermost part of each attaching section. Each attaching section 106, 107, 108 and 109 has a pair of rails 106d, 107d, 108d and 109d, which are arranged in the longitudinal direction of the attaching section.

Preferably, the height of the lead frame supplying section 4, the resin supplying section 5, the press units 3a and 3b, and the lead frame accommodating section 6 are correctly set when they are attached to the base unit 105. At least the height of the parting faces of the dies of the press units 3a and 3b are correctly set when the press units 3a and 3b are attached. Note that, the attaching sections 106, 107, 108 and 109, which are capable of automatically setting the height of the lead frame supplying section 4, the resin supplying section 5, the press units 3a and 3b, and the lead frame accommodating section 6, are not essential elements of the present embodiment. The essential structure of the present embodiment is that the lead frame supplying section 4, the resin supplying section 5, the press units 3a and 3b, and the lead frame accommodating section 6 can be solely attached to and detached from the base unit 105. Further, the lead frame supplying section 4, the resin supplying section 5 and the lead frame accommodating section 6 may be fixed to the base unit 105; the press units 3a and 3b must be solely attached to and detached from the base unit 105.

In the present embodiment, the press units 3a and 3b, the lead frame supplying section 4, the resin supplying section 5 and the lead frame accommodating section 6 can be solely attached to and detached from the base unit 105. With this structure, the lead frame supplying section 4 can be exchanged according to the number of the lead frames to be supplied. The resin supplying section 5 can be exchanged according to means for supplying the resin, e.g., a tablet magazine, a resin feeder, or according to the type of the resin, e.g., resin tablets, resin pellets. The press units 3a and 3b can be exchanged according to amount of production or type of the products. The lead frame accommodating section 6 can be exchanged according to the type of the accommodating magazine, e.g., a piling magazine, a slit magazine.

Therefore, the resin molding machine of the present embodiment can be used for a wide use.

In the above described embodiments, the press units has a plurality of the pots, but the present invention can be applied to the resin molding machine having the press units, each of which has one pot. Further, ball grid array (BGA) substrates, polyimide substrate tapes, etc., other than the lead frames "L", may be used as the works to be molded.

The invention may be embodied in other specific forms without departing from the spirit or essential characteristics thereof. The present embodiments are therefore to be considered in all respects as illustrative and restrictive, the scope of the invention being indicated by the appended claims rather than by the foregoing description and all changes which come within the meaning and range of equivalency of the claims are therefore intended to be embraced therein.

What is claimed is:

1. A resin molding machine, comprising:
   a work supplying section including a lead frame supplying section for supplying lead frames, which are accommodated in a supplying magazine, and a resin supplying section for supplying resin tablets, which have been accommodated in a resin accommodating section, by a holder, which is capable of moving in the vertical direction;
   a product accommodating section including a degating section for removing disused resin from the molded lead frames, and an accommodating magazine for accommodating the molded lead frames from which the disused resin has been removed;
   an attaching section to which a press unit is detachably attached; and
   a base unit including a loader for conveying the lead frames from said work supplying section to said press unit, an unloader for collecting the molded lead frames from said press unit and conveying the same to said product accommodating section, and a conveying route on which said loader and unloader are moved,
   wherein said press unit includes a clamping mechanism for clamping the lead frames between an upper fixed die and a lower movable die, a transfer mechanism for pressurizing and sending the resins, which have been supplied in pots, by vertically moving plungers, which are provided in the lower die, and driving means for vertically moving said clamping mechanism and said transfer mechanism.

2. The resin molding machine according to claim 1, wherein a plurality of said press units are respectively detachably attached to said attaching sections.

3. The resin molding machine according to claim 1, wherein a plurality of said press units are respectively detachably attached to said attaching sections, which are provided on both side faces of said conveying route.

4. The resin molding machine according to claim 1, wherein a plurality of press units are provided and each of said press units further includes a press operating section for inputting control signals and a press control section for controlling said driving means, and
   wherein operation of one of said press units can be stopped while operating said resin molding machine for maintenance of the dies.

5. The resin molding machine according to claim 1, wherein a plurality of press units are provided and each of said press units further includes a press operating section for inputting control signals and a press control section for controlling said driving means, and
   wherein said press units can be respectively operated while operating said resin molding machine so as to mold different lead frames.

6. The resin molding machine according to claim 1, wherein said driving means is an electric motor, and
   wherein said clamping mechanism comprises:
   a movable platen for supporting the lower die; and
   a toggle mechanism being driven by said electric motor so as to vertically move said movable platen.

7. The resin molding machine according to claim 6, wherein said transfer mechanism comprises:
   a screw shaft being rotatably provided to said movable platen;
   a nut being screwed with said screw shaft, said nut being capable of vertically moving on said screw shaft; and
   a pressure equalizing unit for equally applying pressure to said plungers, said pressure equalizing unit being capable of vertically moving together with said nut when said electric motor rotates said screw shaft.

8. The resin molding machine according to claim 7, wherein said pressure equalizing unit includes a hydraulic circuit for equally applying hydraulic pressure to said plungers.

9. The resin molding machine according to claim 1, wherein an attaching position of said press unit, in the attaching-detaching direction and the direction perpendicular to the attaching-detaching direction, can be correctly positioned by attaching said press unit to the attaching section of said base unit.

10. The resin molding machine according to claim 1, wherein said loader and said unloader are vertically arranged and independently reciprocally moved on said conveying route, and
    wherein a supplying member of said loader and a collecting member of said unloader are capable of reciprocally moving into a space between the upper die and the lower die, which are opened, from the conveying route side.

11. The resin molding machine according to claim 10, wherein said loader and said unloader can be independently rotated by separated rotating means and respectively moved between rotating positions and reciprocating positions on said conveying route.

12. The resin molding machine according to claim 10, wherein said supplying member comprises:
    an upper movable frame;
    an upper cleaner for cleaning the upper die;
    an upper sucking hole for sucking dusts removed from the upper die; and
    and upper sucking duct being connected to the upper sucking hole, and
    wherein said collecting member comprises:
    a lower chucking hand for holding the lead frames in a lower movable frame, the lower chucking hand being capable of moving downward;
    a lower cleaner for cleaning the lower die;
    a lower sucking hold for sucking dust removed from the upper die; and
    a lower sucking duct being connected to the lower sucking hole.

13. The resin molding machine according to claim 12,
wherein said upper cleaner enters a space between the upper die and the lower die and cleans the upper die with said upper chucking hand holding the lead frames when said lower movable frame moves out from said press unit with said lower chucking hand holding the molded products and said lower cleaner cleaning the lower die as if said lower movable frame is replaced with said upper movable frame.

14. The resin molding machine according to claim 10,
wherein said loader and said unloader are moved in the direction crossing the reciprocal moving direction of said supplying member and said collecting member with respect to said press unit.

15. The resin molding machine according to claim 10,
wherein said work supplying section, said resin supplying section, said attaching sections and said product accommodating section are arranged to enclose said loader and said unloader.

16. The resin molding machine according to claim 15,
wherein said work supplying section, said resin supplying section and said product accommodating section are respectively formed into units, which can be assembled to and disassembled from said base unit.

* * * * *